United States Patent [19]

Byrne et al.

[11] 4,049,950
[45] Sept. 20, 1977

[54] ANIMAL FOOD CONSUMPTION MONITOR

[75] Inventors: John A. Byrne; Charles K. Rhea, Jr.; Thomas F. Fleming, all of Cookeville, Tenn.

[73] Assignee: Universal Identification Systems, Inc., Cookeville, Tenn.

[21] Appl. No.: 617,938

[22] Filed: Sept. 29, 1975

[51] Int. Cl.$^2$ .......................... G06K 7/08; A01K 5/02
[52] U.S. Cl. .............................. 235/61.6 R; 119/51 R
[58] Field of Search ............... 119/51 R; 235/61.6 R, 235/61.7 B, 61.9 R, 61.9 A, 61.11 H, 61.6 L; 222/52; 340/146.3 K

[56] References Cited

U.S. PATENT DOCUMENTS

| | | | |
|---|---|---|---|
| 3,553,441 | 1/1971 | Launder | 119/51 R |
| 3,557,757 | 1/1971 | Brooks | 119/51 R |
| 3,557,758 | 1/1971 | Lack | 119/51 R |
| 3,750,626 | 8/1973 | Smith | 119/51 R |
| 3,852,571 | 12/1974 | Hall | 235/61.7 B |
| 3,917,924 | 11/1975 | Linne | 235/61.6 L |
| 3,929,277 | 12/1975 | Byrne | 235/61.6 R |

*Primary Examiner*—Robert M. Kilgore
*Attorney, Agent, or Firm*—William S. Dorman

[57] ABSTRACT

A system for determining and registering the amount of food consumed in a given period of time by each of a plurality of animals, such as cattle, comprising a feed station which the animals can enter individually and separately for feeding purposes. The feed station includes a food hopper mounted on a load sensing means whose output changes as the amount of food in the hopper changes. Means, such as a photo-electric sensing device, are provided to determine the presence of an animal at the feed hopper. The actuation of the photo-electric sensing means will energize a scale weight measuring means which sends a series of pulses corresponding to the weight of food in the hopper to a consumption measuring means. Actuation of the photo-electric sensing means will also energize an interrogation coil which repeatedly sends electromagnetic pulses to the animal to actuate an identification tag attached to the animal. The tag includes a small R.F. transmitter capable of transmitting an R.F. pulse while the interrogation coil is activated. Each tag has its own source of power which will be momentarily engaged during the period of time that the interrogation coil is transmitting. One or more magnetic reed switches in the tag will be momentarily actuated by the electromagnetic pulse from the electromagnetic interrogation coil. The overall apparatus is provided with an R.F. receiver which will receive the pulses from the tag transmitter. The receiver will determine the identity of the animal by the frequency being transmitted by the tag. The receiver will sample the frequency during several time periods to eliminate an incorrect identification resulting from outside R.F. interference. The receiver will then "latch" an identification control means with the identity corresponding to the frequency transmitted by the tag. When the animal leaves the feed station, the weight of food in the hopper will be measured again and subtracted from the weight measured immediately after the animal entered the feed station. The difference between those weights is the amount consumed by the animal. With the identity provided by the identification control means, the information as to the total amount of food consumed by that given animal previous to the feeding period which just ended will be "loaded" into an "additive" means from the memory cells corresponding to that given animal. The cumulation of the amount of food consumed during the feeding period which just ended and the total "loaded" from the memory cells will be determined and "written" into the memory cells corresponding to that given animal by the additive means.

After the animal departs, various portions of the apparatus will be returned to zero in readiness for the entry of the next animal. The information in the memory cells is printed out periodically. After the information in the memory cells is printed, the memory cells will be zeroed. An incandescent display is provided to allow visual inspection of the information in the memory cells.

9 Claims, 25 Drawing Figures

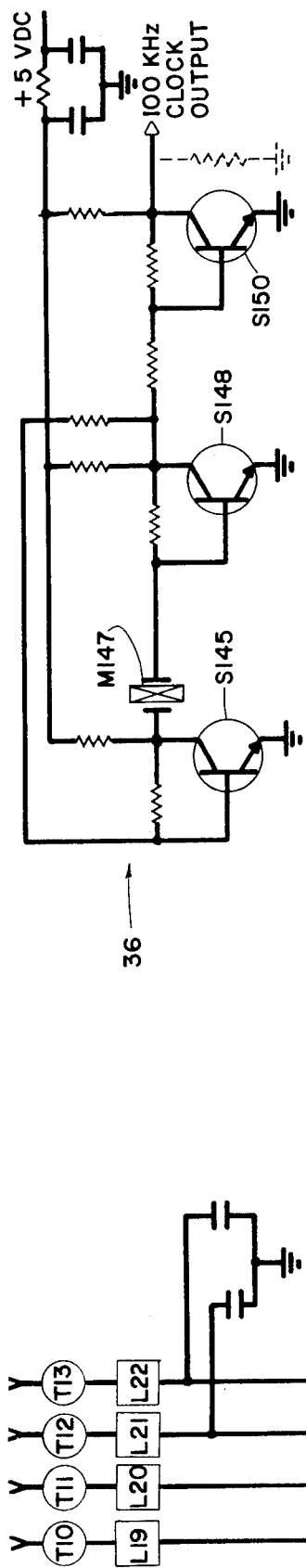
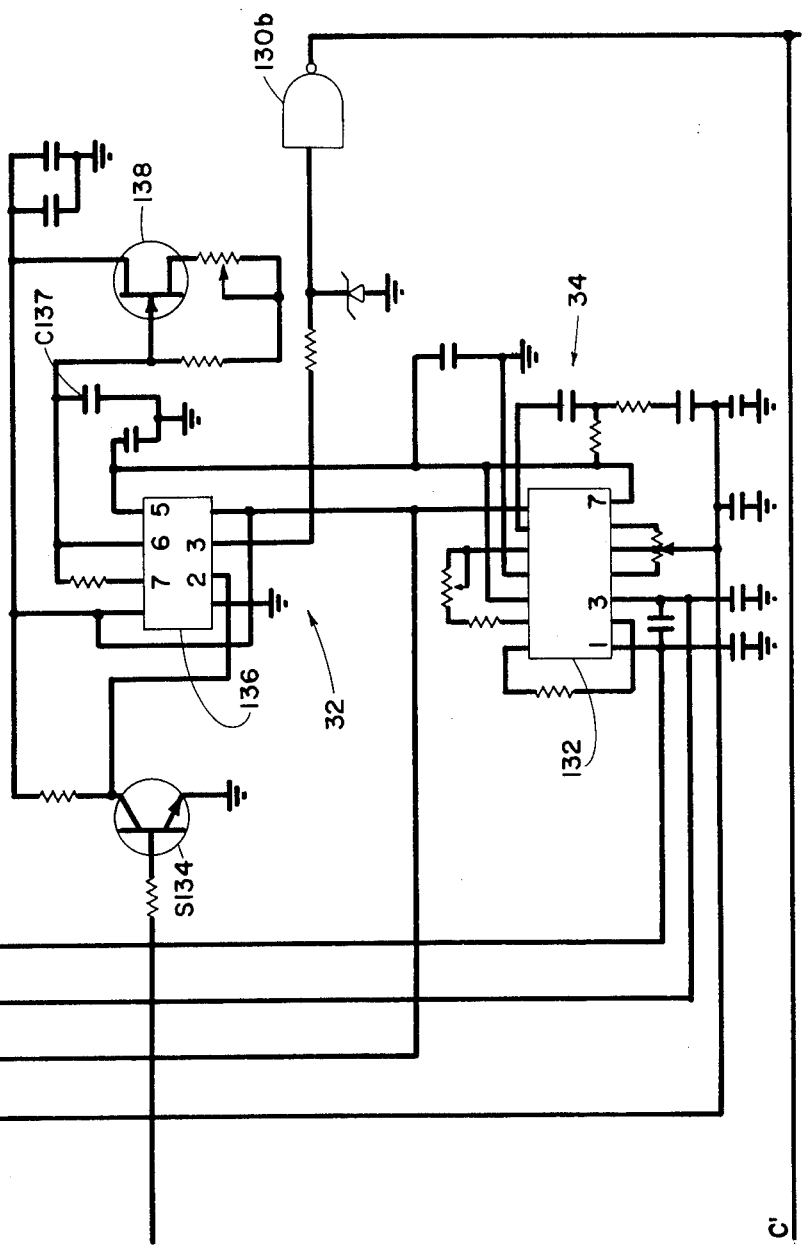
Fig. 4a
Fig. 4

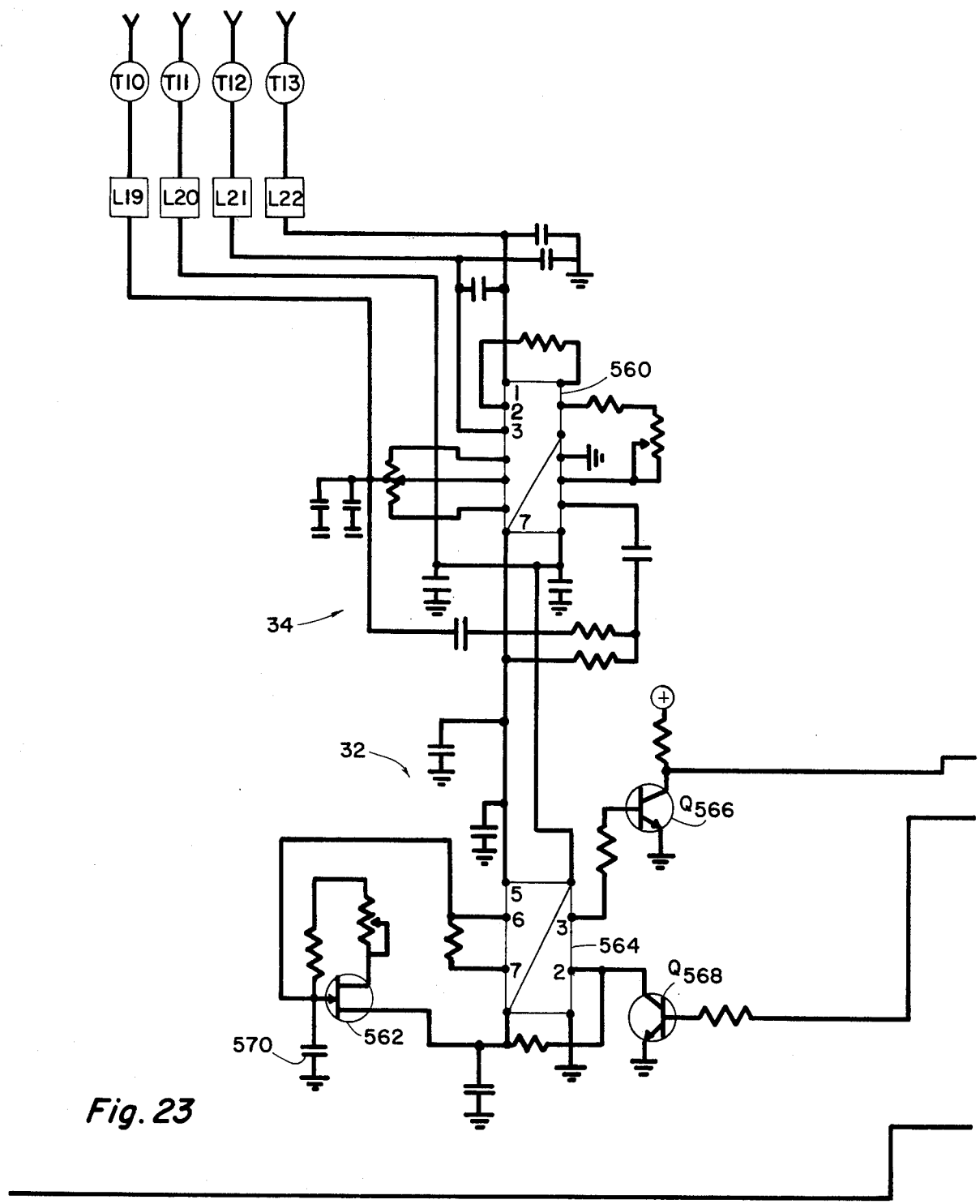
Fig. 23
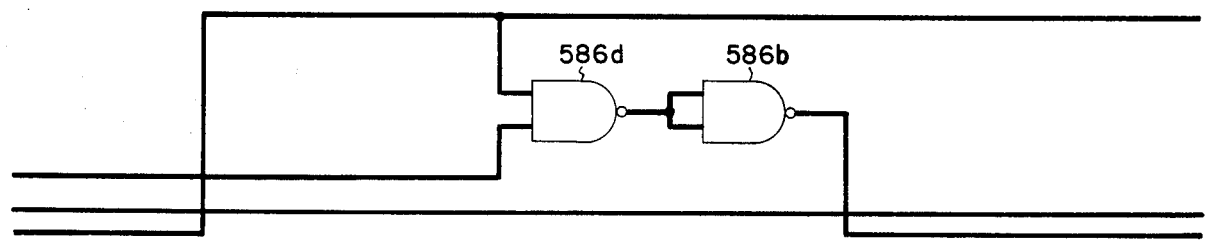

ANIMAL FOOD CONSUMPTION MONITOR

CROSS-REFERENCE TO RELATED APPLICATION

This invention constitutes an improvement over the invention disclosed and claimed in copending application Ser. No. 532,204 filed on Dec. 12, 1974, in the names of the inventors John A. Byrne and Charles K. Rhea, Jr. for "Animal Food Monitor", and assigned to the assignee of the present application.

FIELD OF THE INVENTION

This invention relates to apparatus for determining and recording, for latter use, the amount of food consumed by an animal. More particularly, the present invention is designed to measure, store and register periodically or, when desired, information concerning the amount of food consumed by each of a plurality of animals.

THE PRIOR ART

It is well recognized that not all animals of a given class are equally efficient from the standpoint of putting on weight. For example, one animal might put on more weight for the consumption of a given amount of food than another animal of the same age and breed who consumes an identical quantity of food. If these "efficient" animals could be segregated from the rest and cross-bread, it might be possible to develop a breed of animals which could put on a maximum of weight for a minimum quantity of food consumed. The savings in feed could lead to a reduction in the cost of meat to the consumer.

Attempts have been made in the past to identify these efficient animals by keeping a record of the amount of feed which the individual animals had consumed. However, except for the invention disclosed in the aforementioned copending application, efforts to observe and measure the eating propensities of individual animals have been largely unsuccessful.

SUMMARY OF THE INVENTION

The present invention involves a feed station, located at a feed lot for example, where only one animal at a time can enter the feed station and feed from the feed hopper. There will be a number of animals in the feed lot who will have access to the feed station so that the animals will not be lonely or isolated from other animals.

Each animal will be assigned a separate radio frequency and a corresponding number. Each animal is provided with a separate identification means, referred to herein as a tag which can be attached to the animal's ear, for example, or which might be imbedded under the animal's skin, if desired. Each tag will transmit a radio frequency pulse when actuated and the frequency of the transmitted pulse will be the frequency assigned to that given animal. The system includes a radio frequency receiver which receives and determines the identity of the animal by the frequency of the tag that has been actuated repeatedly after the animal entered the feed station. The frequency is sampled several times and a comparison made to determine if the pulses have the same frequency. If the pulses do not have the same frequency, the receiver will continue to sample R.F. pulses until it can verify the identity of the animal or the animal leaves the feed station. The information gathered by the receiver is changed into a form that will locate a specific memory cell (corresponding to the identity of the given animal) within a memory bank. The identification is then stored in the animal's identification control which provides the address to the memory address circuit. The memory address circuit provides the address to the memory cells corresponding to the identity of the given animal when needed.

The food, which is to be consumed by the animal, is located in a feed hopper. The food hopper rests upon scales which are adapted to measure, and transmit information relative to the weight of feed contained in the hopper. The scales include a scales load cell with means for changing the pressure exerted on the scales load cell into an electrical voltage representing the amount of food contained in the hopper. The output of the scales load cell varies linearly with the weight of the food in the feed hopper; for example, the greater the weight of food, the proportionally greater the output voltage of the load cell. When the weight of food is to be determined, the output voltage of said scales load cell is converted to a series of pulses which correspond to the weight of food in the hopper. The weight is determined immediately after the animal enters and immediately after the animal leaves the feed station. The pulses are counted up by the up-down counters when the animal enters the feed station, and then down by the up-down counters when the animal leaves. If the difference between the weights contained in the up-down counters is greater than a certain minimal value which is set into the system, for example, 0.3 pounds, the amount of food consumed by the animal during any prior feedings contained in the memory cells corresponding to the identity of the animal provided by the memory address is "loaded" into the up counters. The amount consumed by the animal during the feeding period which just ended will be counted into the up counters from the up-down counters. The new cumulative amount will be "written" into the memory cells corresponding to the given animal. If the receiver was not able to provide an identity, the memory address will provide an address, for example, zero-zero, to the memory cells allocated to store consumption amounts when identity cannot be determined. After the cumulation is written into the memory cells, the up-down counters and the address stored in the animal's identification control are zeroed and the apparatus is ready for the next animal entry. If the difference between the weight is less than the set minimal value, the weight "loaded" from the memory is "written" back into the appropriate memory cells. The up-down counters and the address stored in the animal identification control are zeroed and the apparatus is ready for the next animal entry.

The memory involved in the present invention is a series of electronic latches (one for each animal) that can receive and hold information. This information can be retrieved at any time. Preferably, the information will be in the form of a four digit number, as will be explained hereinafter. As indicated above, each animal will have its own memory space and the total amount that each given animal eats will be collected in its exclusive memory space. The total for all animals individually can be automatically registered on a daily basis, or when desired; if more or less than four digits of information are desired, the memory space can be enlarged or reduced with very little problem.

The register is a printer which is preferably activated once every 24 hours, for example, at midnight, by a 24 hour clock. The printer will then print out, onto a paper strip, the identifying number of the animals, the amounts of food consumed which are stored in the memory for all of the animals, the identity of the apparatus, and the day of the test. After each identifying number and amount consumed is printed out, the memory cells for that animal are zeroed and the memory address advanced by one. Thus, the printer will cycle through all of the memory addresses one at a time and print out the information contained in each address. If an animal enters the feed station before the print cycle has begun, any signal to begin the print cycle will be delayed until after the animal leaves. If the print cycle has begun and the animal leaves before the print cycle ends, weight of food present in the food hopper at entry is stored in the up-down counters until the print cycle is completed. When the print cycle is completed, the apparatus will resume normal operation.

The memory may be scanned, after the closing of a manual switch, by observing an incandescent display.

BRIEF DESCRIPTION OF THE DRAWINGS

FIGS. 2, 3, 4, and 5, taken in combination, with the lower half of FIG. 3 placed to the right of FIG. 2, FIG. 4 placed directly above FIG. 3, and FIG. 5 placed directly above FIG. 2 and to the left of FIGS. 4 and 3 (as determined by the matching of the letters A' to C'), constitute a logic diagram of the system control logic 30, scales integrator 32, scales amplifier 34, power outage detector 38, and presence amplifier 57 of FIG. 1.

FIG. 4a is a circuit diagram of the 100 KHz clock 36.

FIGS. 22, 23, and 24, taken in combination with FIG. 23 placed directly to the right of FIG. 22 and FIG. 24 placed directly to the right of FIG. 23 with outputs aligned, constitute a second embodiment of the system control logic 30 of FIG. 1.

DESCRIPTION OF THE PREFERRED EMBODIMENTS

Figure 1:
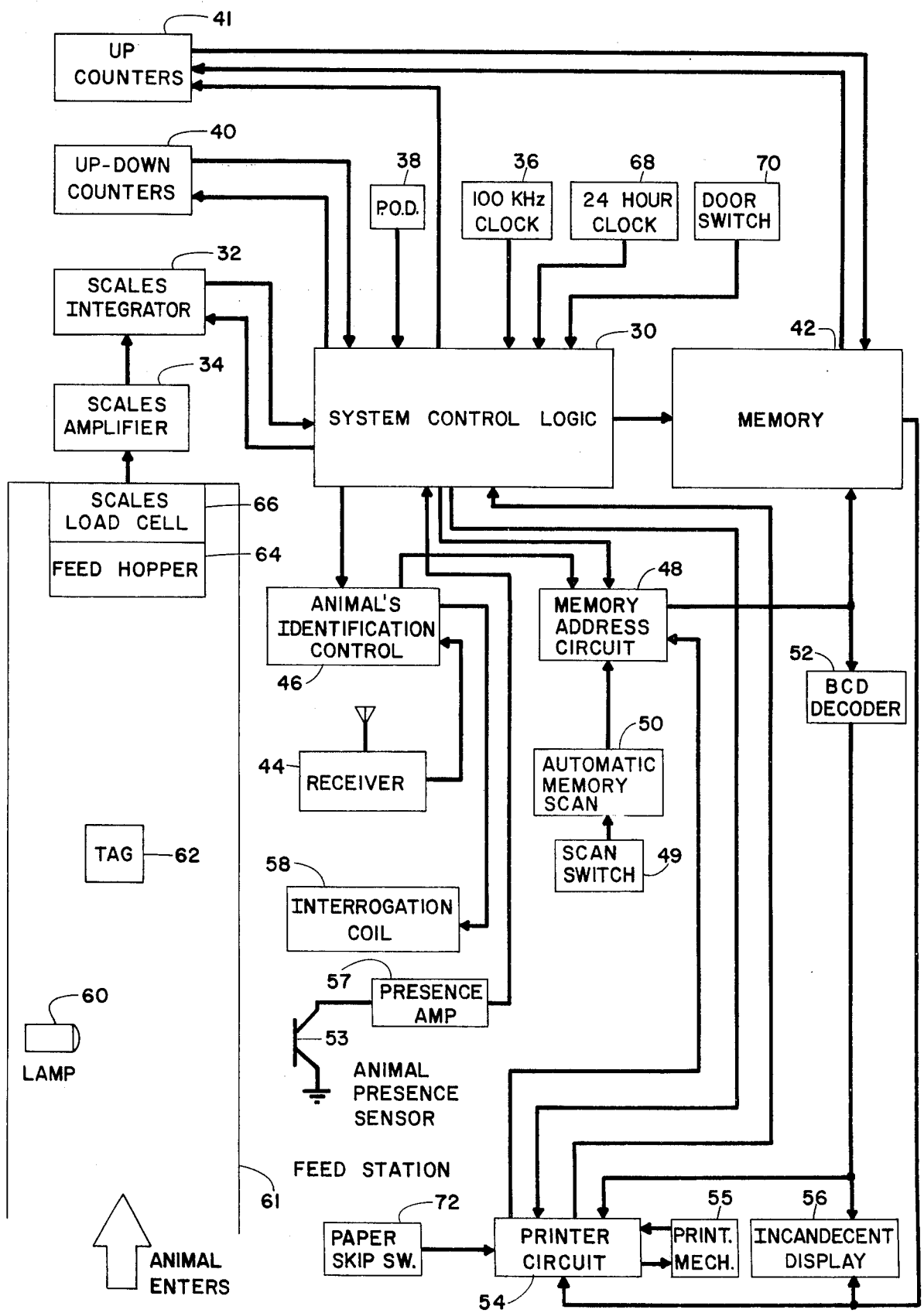
FIG. 1 is a block diagram showing the major components of the present invention.

Referring to the drawings in detail, FIG. 1 shows a feed station 61, which will permit the entry of an animal (not shown) such as a calf. The feed station 61 is provided with a feed hopper 64 opposite from the open end where the animal enters. A lamp 60 is located near the entrance to the feed station 61. Lamp 60 will direct a beam of light to an animal presence sensor 53 which will include one or more photo-electric cells or the equivalent. The animal will be provided with a tag 62. The tag is preferably attached to the ear of the animal or hung by some type of collar about its neck and would be approximately in the position shown in FIG. 1 after the animal interrupted the light beam from the lamp 60 to the animal presence sensor 53 when it was approaching the feed hopper.

When the animal interrupts the beam of light from the lamp 60 to the animal presence sensor 53, the latter sends a signal to the presence amplifier 57 which in turn sends a signal to the system control logic 30, the initial purpose of which, as will hereinafter appear, is to determine the amount of feed in the hopper 64 before the animal begins to feed. The system control logic 30 sends a signal to the scales integrator 32 which initiates its cycle. The feed hopper 64 will be resting on a scale apparatus (not shown) which includes a scales load cell 66. The output voltage of the scales load cell 66 varies linearly as the weight in the hopper changes. The scales load cell 66 sends an output to the scales amplifier 34; the output of the latter is coupled to the scales integrator 32. The voltage output of scales amplifier 34 controls the length of time the scales integrator 32 operates. While the scales integrator 32 is in operation, the system control logic 30 sends pulses to the up-down counters 40. These pulses are counted up from zero in the up-down counters 40 until the scales integrator 32 sends a signal to the system control logic 30 indicating integration is complete. When the signal from the scales integrator 32 is received, the system control logic 30 ceases to send pulses to the up-down counters 40. Because the voltage output of the scales load cell 66 represents the weight of feed in the hopper 64, the number of pulses sent out by the system control logic 30 to the up-down counters before the scales integrator 30 sends its signal will represent the amount of feed in the hopper 64 at the time that the animal entered the feed station 61. This process converts the analog output of the scales load cell 66 to discrete digital information. The system control logic 30 sends a signal to the animal's identification control 46 which in turn allows signals from the receiver to turn on the interrogation coil 58. The interrogation coil 58 sends an electromagnetic pulse to the tag 62. The tag 62 has an internal circuit which will be described hereinafter, and which, in response to the signal from the interrogation coil 58, sends a signal to a receiver 44 used to identify the particular animal which has entered the feed station 61. As the receiver 44 receives the signal properly identifying the animal, the animal's identity is "latched" in the animal's identification control 46. After the latter has stored a valid identity, the animal's identification control 46 then does two things. First, the animal's identification control 46 shuts off the interrogation coil 58. Second, the animal's identification control 46 sends the animal's identity through the memory address circuit 48 which then calls up the memory cells from the memory 42 corresponding to the identity of the animal in feed station 61.

After the animal finishes feeding and leaves the feed station 61, the animal presence sensor 53 is again activated by lamp 60; i.e., the light beam from the lamp 60 is re-established. At this time it is desired to measure the amount of feed left in the hopper to determine how much feed was consumed by the animal during this feeding period. Activation of the animal presence sensor 53 actuates the presence amplifier 57, which, in turn, sends an amplified signal to the system control logic 30 indicating the animal has left feed station 61. The system control logic 30 then sends a pulse to the scales integrator 32 whose operation is described above. However, during this integration cycle, the system control logic 30 sends pulses to the up-down counter 40 counting down until the scales integrator has completed its cycle; at the same time, the system control logic 30 "loads" the consumption of any previous feedings since the last printout for that particular animal, using the identity supplied by the memory address circuit 48 from the appropriate memory cells in memory 42 into the up counters 41. The number remaining in the up-down counters 40 after the count down operation represents the amount of feed consumed during the feeding period which just ended.

Each count represents a predetermined amount of weight, for example, 0.1 pound. The up-down counters 40 send a signal to the system control logic 30 indicating whether or not the animal consumed an amount sufficient to record. If the consumption was significant, the system control logic 30 sends pulses to the up counters 41 counting up on top of any counts "loaded" into the up counters from the memory 42. At the same time that the system control logic 30 is sending pulses to the up counter 41, an identical number of pulses are being sent to the up-down counters 40 as down counts. The up-down counters 40 send a signal to the system control logic 30 when the up-down counters 40 reach zero, at which time both up and down count operations from the system control logic 30 stop and the information now in the up counters 41 is "written" into the particular animal's memory cell of memory 42. In the event the particular animal did not consume an amount significant enough to record this feeding, the amount consumed during previous feedings since the last print-out is "written" into the particular animal's memory cell of memory 42. In either situation, after the "write" operation, the up-down counters 40 are zeroed and the animal identity in the animal's identification control is "unlatched" and the entire system is ready to record the consumption of the next animal that enters feed station 61.

Once every 24 hours, the 24 hour clock 68 sends a pulse to the system control logic 30; the latter sends a signal to the printer circuit 54 which turns on the printer motor (not shown) in the printer mechanics 55, and the print cycle will begin. If the master control logic 30 (FIG. 1) signals either that there is an animal in the feed station 61, or that the scales integrator 32 is actuated, or that a weight of feed consumed is being processed after an animal has left (as described above), then the print cycle will be delayed. When the system control logic has completed its cycle and "written" the weight into the memory 42, the print cycle will begin.

If an animal enters the feed station 61 after the print cycle has begun, the system control logic 30 will begin its cycle. The pulse train representing the initial weight of feed will be counted up to the up-down counters 40. The animal's identity will be stored in the animal identification control 46. This is the normal operation of the apparatus. If at this point, the print cycle is not completed and the animal leaves, the system control logic 30 is inhibited until after completion of the print cycle. If the print cycle is over when the animal leaves, the system control logic 30 will function normally, just as if the print cycle had occurred before the animal entered.

During the print cycle, the printer mechanics 55 send timing pulses to the printer circuit 54 where they are amplified for further use in the printer circuit 54 as well as being sent to the system control logic 30. After the system control logic 30 senses a predetermined number of pulses indicating the motor is on and at sufficient speed to allow the print cycle to begin, the system control logic 30 sends a signal to the printer circuit 54 to initiate the print cycle. The information printed out by the printer mechanics 55 includes the following: the animal's identification number, the weight of food consumed by that animal since the last printout, the identity number of the machine itself, and the day number of the test. The identity number of the machine and the day number of the test, however, are printed only on the first line. In addition to the first line, 15 more lines are printed by the printer mechanics 55 for each print cycle, one line for each animal giving his identification number and his feed consumption since the last print cycle. After each line is printed, the identity counter in the printer circuit 54 advances one identity. Information from the identity counter in the printer circuit 54 is transferred to the memory address circuit 48. The BCD (binary coded decimal) decoder 52 takes the address from memory address circuit 48 and converts it into a form usable by the printer circuit 54. During the print cycle, the system control logic 30 sends a signal to the memory address circuit 48 to accept addressing only from the printer circuit 54. The memory address circuit 48 in turn passes this information to the memory 42 where it addresses the appropriate memory cell. After all 16 lines have been printed, the printer circuit 54 sends a signal to the system control logic 30 which in turn sends a signal to the printer circuit 54 turning the motor in the printer mechanics 55 off. After each weight from the memory 42 is printed, the addressed memory cells are zeroed.

When the door (not shown) to the electronics box (housing, not shown, for electronics being described) opens, the door switch 70 sends a signal to the system control logic 30 which reacts by sending a signal to the printer circuit 54 which supplies power to the motor in the printer mechanics 55. This allows the machine attendant to advance the paper in the printer mechanics 55 anytime the door is open. The paper skip is activated by the manually operated paper skip switch 72 which sends a signal to the printer circuit 54 which in turn activates the skip function in the printer mechanics 55.

In addition to being able to address the memory 42 from both the animal's identification control 46 and the printer circuit 54 by way of the memory address circuit 48, the latter also receives information from the automatic memory scan 50 which is activated by the manually operated scan switch 49. The purpose of the scan switch 49, as will appear more fully hereinafter, is to permit inspection of the food consumption of the animals and the incandescent display 56 without having to wait for the next printout. The automatic memory scan 50 sends information to the memory address circuit 48 in a low-to-high numerical sequence to address all sixteen memory cells in memory 42. The automatic memory scan 50 automatically shuts itself off after number 15 identity has been sent from the automatic scan 50 to the memory address circuit 46.

The function of the memory address circuit 48 is to respond to various sources which seek information from the memory 42. These sources are the printer circuit 54, the system control logic 30, and the automatic memory scan 50.

The identity being addressed by the memory address circuit 48 (after it passes through the BCD (binary coded decimal) decoder 52 and the weight stored in the appropriate memory cells of memory 42 will be displayed by the incandescent display 56.

The 100 KHz clock 36 produces a 100 KHz square wave. The 100 KHz square wave is used to delay the occurrence of certain steps in the logic sequence, through the use of the clock function of a number of J-K flip-flops, and as the pulses sent to the up-down counters 40 and up counters 41.

P.O.D. 38 is a power outage detector that is connected to the positive supply voltage. When the machine is turned on, the rise in voltage level is detected by the P.O.D. 38 which in turn generates a pulse used to reset the system control logic 30 and actuate a print cycle which is used to clear the memory 42. This will also happen when the external power to the entire system is reactivated after being off long enough for the auxiliary power supply 494 (FIG. 18) to run down.

Figure 2:
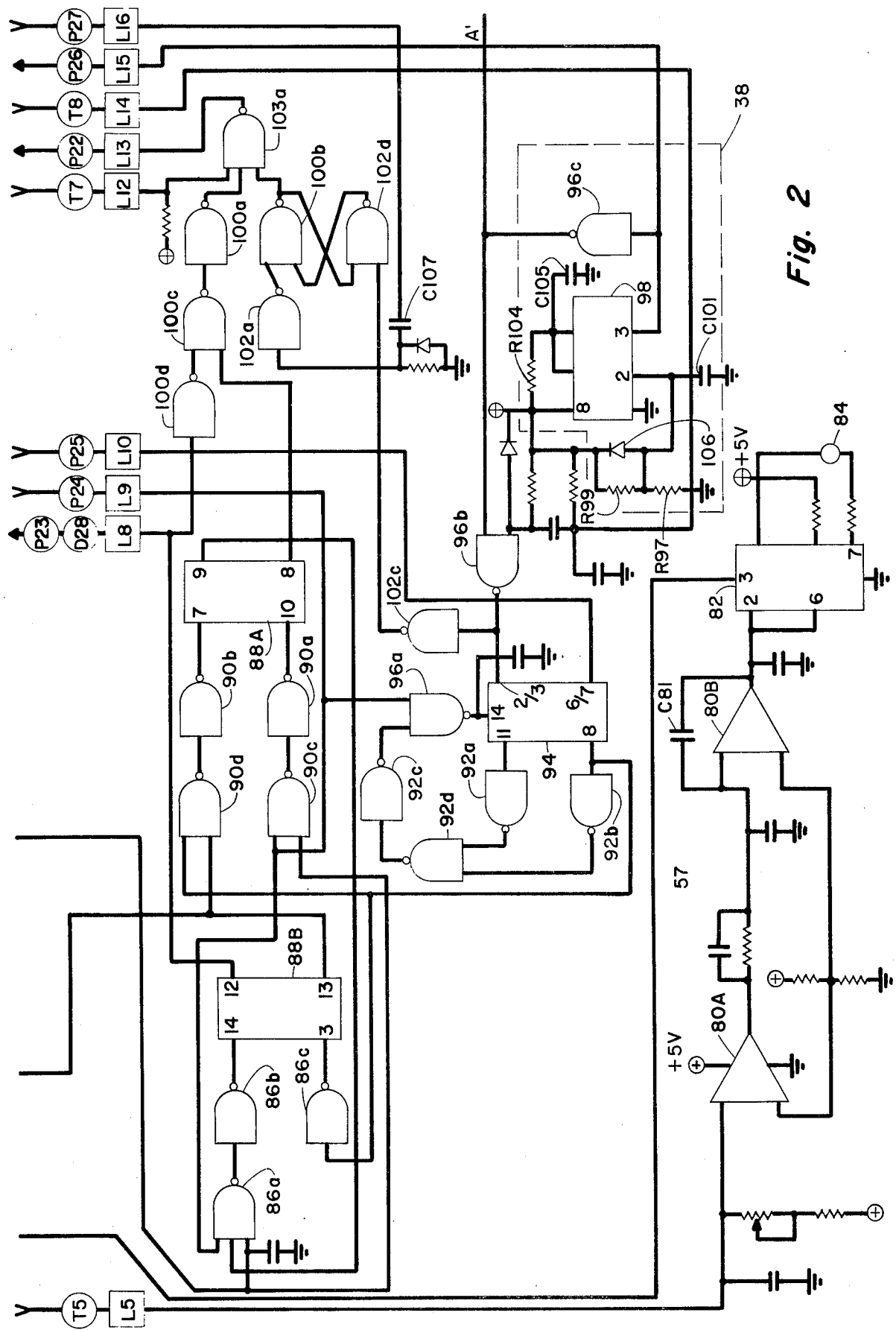
Figure 3:
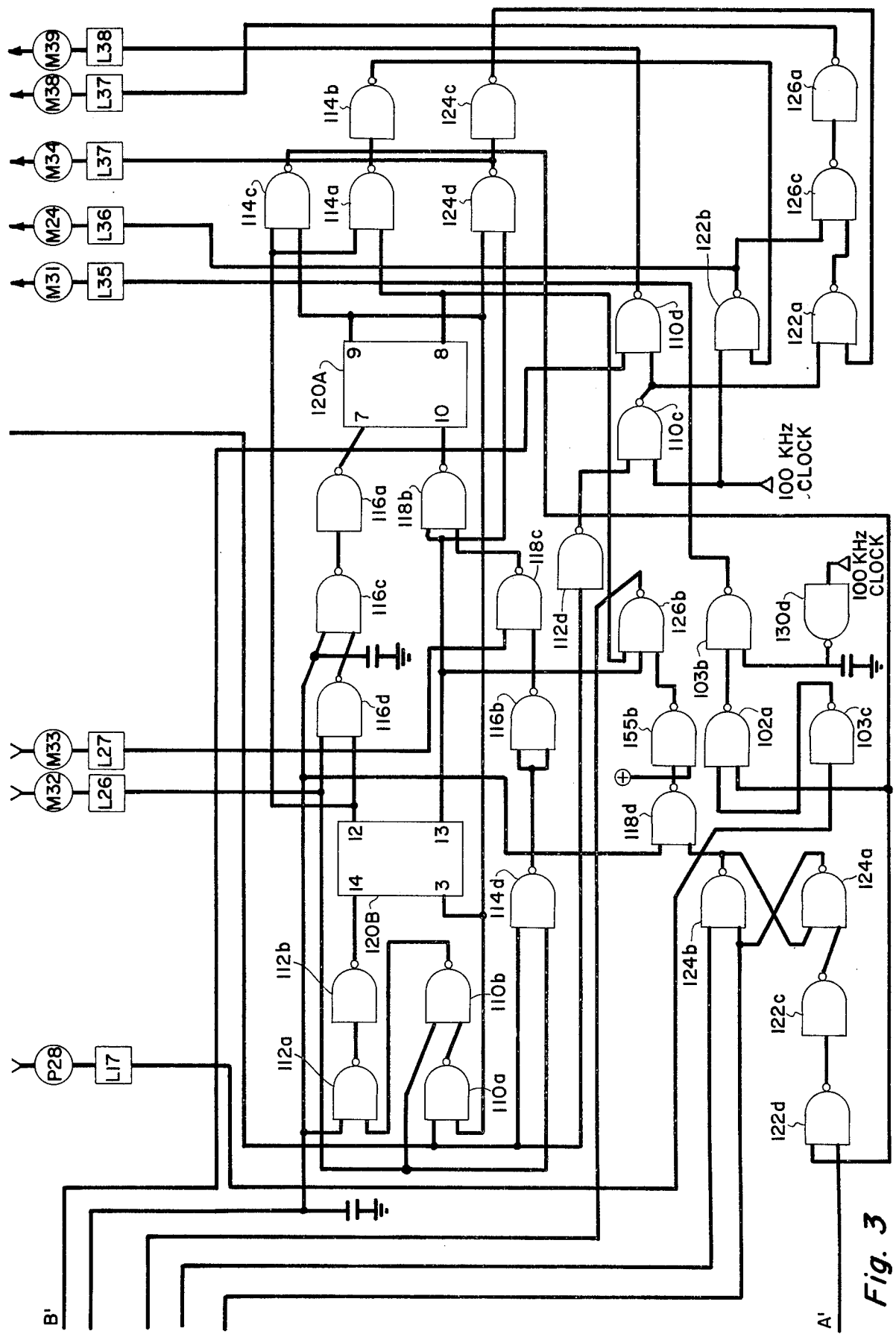

Before proceeding with a detailed description of FIGS. 2 through 4, inclusive, it should be mentioned that the various drawings show, diagrammatically, numerous conventional integrated circuits, or chips, some of the components of which are used in different portions of the overall circuit. Each integrated circuit or chip is provided with a numerical designation and component parts thereof are provided with letter designations following the number. Also, the various connectors are provided with a letter designation, and each pin or socket is provided with a numerical designation following the letter. Thus, each connection will have two letter-number designations both of which will be used in the text to identify the connection. Where necessary for clarity, some of the inputs to the circuits from the power supply are designated by a plus sign enclosed by a circle.

Figure 5:
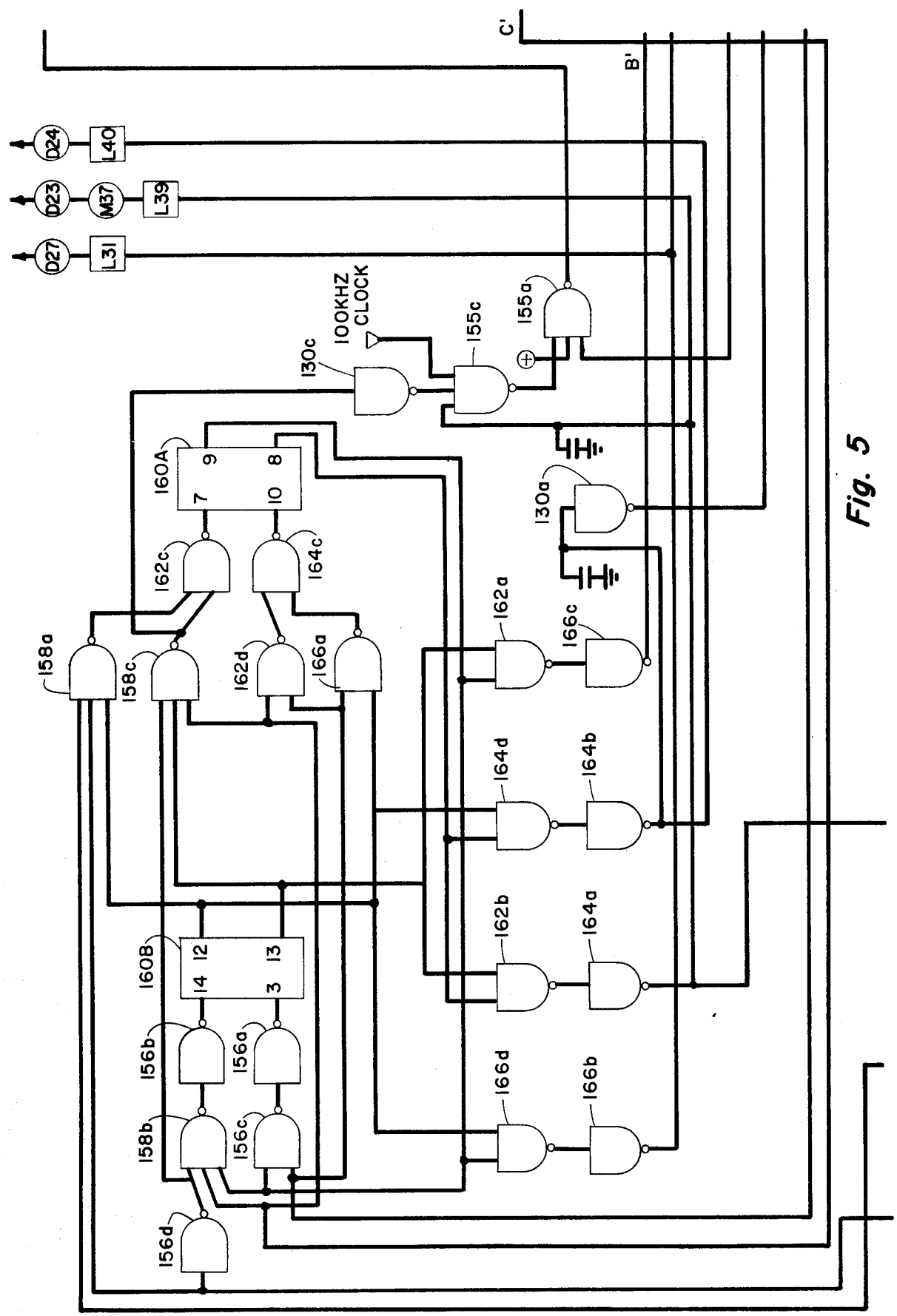

When the apparatus is turned on after a power drop, the power outage detector 38 (to be discussed in detail hereinafter) will send a pulse through an inverter 96c (FIG. 2) to pins 2 and 6 (not shown) of ICS 88A, 88B, 120A, 120B, and 160A, and 160B (all J-K flip-flops, 7473) (FIGS. 2, 3 and 5). This pulse will clear the J-K flip-flops (explained in detail hereinafter) and the outputs of the flip-flops will be set with pins 13 and 8 high and pins 12 and 9 low. The pulse from the power outage detector will also reset the flip-flop formed by ICs 124a and 124b (NAND gates) (FIG. 3). The output of IC 124a will be high and the output of IC 124b will be low.

As discussed above, when the animal enters the feed station, it interrupts the light beam from lamp 60 (FIG. 1) to animal presence sensor 53 which causes the output of animal presence sensor 53 to go low. The output of the animal presence sensor 53 goes through connection T5-L5 (FIG. 2) to the presence amplifier 57 which includes amplifiers 80A and 80B, IC 82, and associated resistors and capacitors. Thus, the low output of animal presence sensor 53 goes to amplifier 80A (NE 5558) where it causes the output of 80A to go high. The high output 80A causes the output of amplifier 80B (N 5558) to go low. C81 (capacitor), amplifier 80B and IC 82 (NE 555) provide a time delay of 0.2 seconds. After the output of 80A has been high for 0.2 seconds, the output of IC 82 at pin 3 will go low. This low output goes to IC 156d and IC 158a (FIG. 5) which are part of the system control logic 30. The system control logic 30 (FIG. 1) includes all of FIGS. 3 and 5, and FIG. 2 except for the power outage detector 38 and the presence amplifier 57.

Before going further it is necessary to explain the function of the 100 KHz clock of FIG. 4a. S145 and S148 (NPN transistors) with M147 (crystal) form an astable multivibrator whose output is 100 KHz square wave. This square wave is amplified by S150 (NPN transistor). The square wave output of S150 goes to the clock inputs of ICs 88A, 88B, 120A, 120B, 160A, and 160B (not shown), and the designated inputs of ICs 130d, 110c, and 122b (FIG. 3) and IC 155c (FIG. 5). The J-K flip-flops do not change states until the clock pulse is high and begins to go low without regard to how the input to pins 3, 7, 10 and 14 change.

When the output of IC 82, pin 3 (FIG. 2) goes low, the output of IC 156d (NAND gate used as an inverter) (FIG. 5) goes high. All references are to FIGS. 2, 3, 4, and 5 unless stated otherwise. Because the scales integrator is not in operation, the output of 130b (NAND gate) (FIG. 4) is high (explained in detail hereinafter). Pin 13 of IC 160B (J-K flip-flop) will be high as explained above. All of the inputs to IC 158c (NAND gate) are high and its output will go low. This causes two things to happen:

First, the low output from IC 158c will cause IC 130c (NAND gate used as an inverter) to go high. Because pin 8 of IC 160A and pin 13 of IC 160B are high, IC 162b (NAND gate) is low. The output of IC 164a (NAND gate used as an inverter) will be high. When the 100 KHz clock pulse next goes high, IC 155c will go low for the duration of the high pulse. IC 155a (NAND gate) will go high (to be explained in detail hereinafter).

Second, the output of IC 162c (NAND gate) will go high because one of its inputs is low. The high output of IC 162c at pin 7 of IC 160A (J-K flip-flop) will, when the clock pulse begins to go low, cause pin 9 to go high and pin 8 to go low. IC 162b will go high because one of its inputs, pin 8 of IC 160A, is low. IC 164a (NAND gate used as an inverter) will go low and this low signal to IC 155c will prevent any further clock pulses from being passed by IC 155c to IC 155a.

IC 124b is low (as explained above), IC 118d (NAND gate) will be high, IC 155b (NAND gate used as an inverter) is low, and the low input from IC 155b will cause IC 126b (NAND gate) to be high. Because the other inputs to IC 155a (NAND gate) are high, IC 155a goes high during the time that IC 155c goes low. The high pulse from IC 155a starts the scales integrator 32 (FIG. 4). The high pulse from IC 155a will cause the output of S134 (NPN transistor) to go low. This low input to pin 2 of IC 136 (NE 555) causes pin 3 of IC 136 to go high and pin 7 of IC 136 to be released from ground. (The consequences of the high output of pin 3,IC 136 will be discussed hereinafter.) The voltage output from the scales load cell 66 (SSM-1000) (FIG. 1)

is connected through T12-L21 and T13-L27 to pins 1 of IC 132 (Ad 521J, instrumentation amplifier). IC 132 and associated resistors and capacitors form the scales amplifier 34. The amplified output of pin 7,IC 132 goes to IC 136,pin 5. The field effect transistor (FET) 138 provides a constant current. When pin 7,IC 136 is no longer connected to ground (released by the low pulse from IC 155a), 138 (FET) will begin to charge C137 (capacitor). The input to pin 6,IC 136 is the voltage across C137 (from the gate of 138 to ground). When the voltage across C137 is equal to the voltage at pin 5,IC 136, pin 3,IC 136 will go low. The greater the voltage from the pin 7,IC 132, the scales amplifier, the longer it will take the constant current source 138 to charge C137 to an equal voltage. The longer period of time required for the voltage at pin 6,IC 136 to equal the voltage at pin 5,IC 136, the longer the time that pin 3 of IC 136 will be high. While pin 3 of IC 136 is high, the output of IC 130b (NAND gate used as an inverter) will be low.

The low output of IC 130b causes IC 112d (NAND gate used as an inverter) to go high. When the 100 KHz clock pulse goes low, 110c will go high. When the 100 KHz clock pulse goes high, IC 110c will go low. As long as IC 112d remains high, IC 110c will pulse at the same speed as the clock inverting the clock pulse. Since pin 13,IC 160B and pin 9 of 160A (NAND gate) are high, IC 162a will be low. IC 166c (NAND gate used as an inverter) will be high. The high output of IC 166c and the inverter clock pulse from IC 110c will cause IC 110d to cycle at 100 KHz. (The effect is to reinvert the clock pulse.) The clock pulse output of 110d goes through connector L38-M 39 to the up-down counters 40 (FIG. 1)(pin 5 of IC 176 of FIG. 6) where it is counted up. When pin 3 of IC 136 goes low and is inverted to high by IC 130b, IC 112d will go low and IC 110c will go high and remain high without regard to the clock pulse. A higher voltage output of the scales load cell 66 will mean a longer period of time before IC 130b will go high again; this will mean that more pulses will be allowed to pass to the up-down counters. The number of pulses will correspond to the voltage output of the scales load cell. Thus, the analog output of the scales load cell 66 (FIG. 1) corresponding to the weight of feed has been converted to a train of digital pulses.

The high output from IC 130b, IC 156d and pin 9 of IC 160A will cause the output of IC 158b (NAND gate) to go low. Because IC 158b is low, IC 156b (NAND gate used as an inverter) will go high. The high outputs of IC 130b and IC 124a (as discussed above) are applied to IC 162d which causes IC 162d to go low. This low input from IC 162d will cause IC 164c (NAND gate used as an inverter) to go high. Since IC 156b and 164c are high, pin 12 of IC 160B and pin 8 of IC 160A will go high and pin 13 of IC 160B and pin 9 of IC 160A will go low during the next high clock pulse. The high output from pin 8 of IC 160A and pin 12 of IC 160B will cause IC 164d (NAND gate) to go low. IC 164b (NAND gate used as an inverter) will go high.

The high output from IC 164b does two things. First, the high output of IC 164b goes to IC 130a (NAND gate used as an inverter). IC 130a goes low and sets the flip-flop formed by IC 124a and 124b. IC 124b will be high and IC 124a will be low. This is the last action taken by the system control logic 30 until the animal leaves.

Second, the high input goes through connection L40-D24 to IC 314b (NAND gate) (FIG. 11) to begin the animal's identification (to be discussed in detail hereinafter). The output of IC 314a (FIG. 11) will be high because there is not a verified identity in IC 300 and 303 (74192 latches FIG. 11) (discussed in detail hereinafter). Since both inputs to IC 314b are high, IC 314b will go low. IC 314b (NAND gate used as an inverter) (FIG. 11) will go high.

Figure 8:
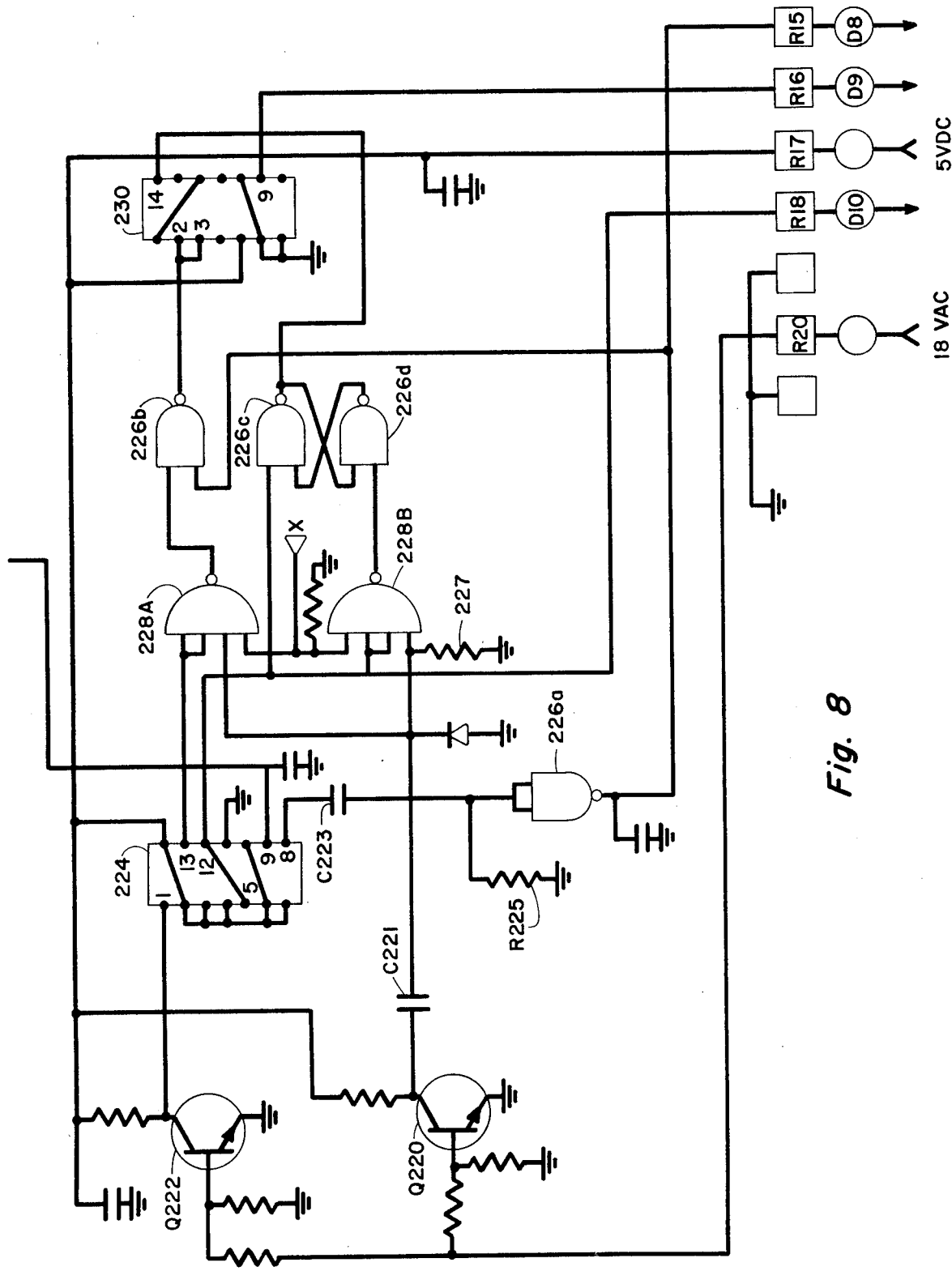
FIGS. 8, 9 and 10, taken in combination, with FIG. 9 placed directly above FIG. 8 and FIG. 10 placed directly above FIG. 9 with outputs aligned, constitute a logic diagram of the receiver 44 of FIG. 1.
Figure 9:
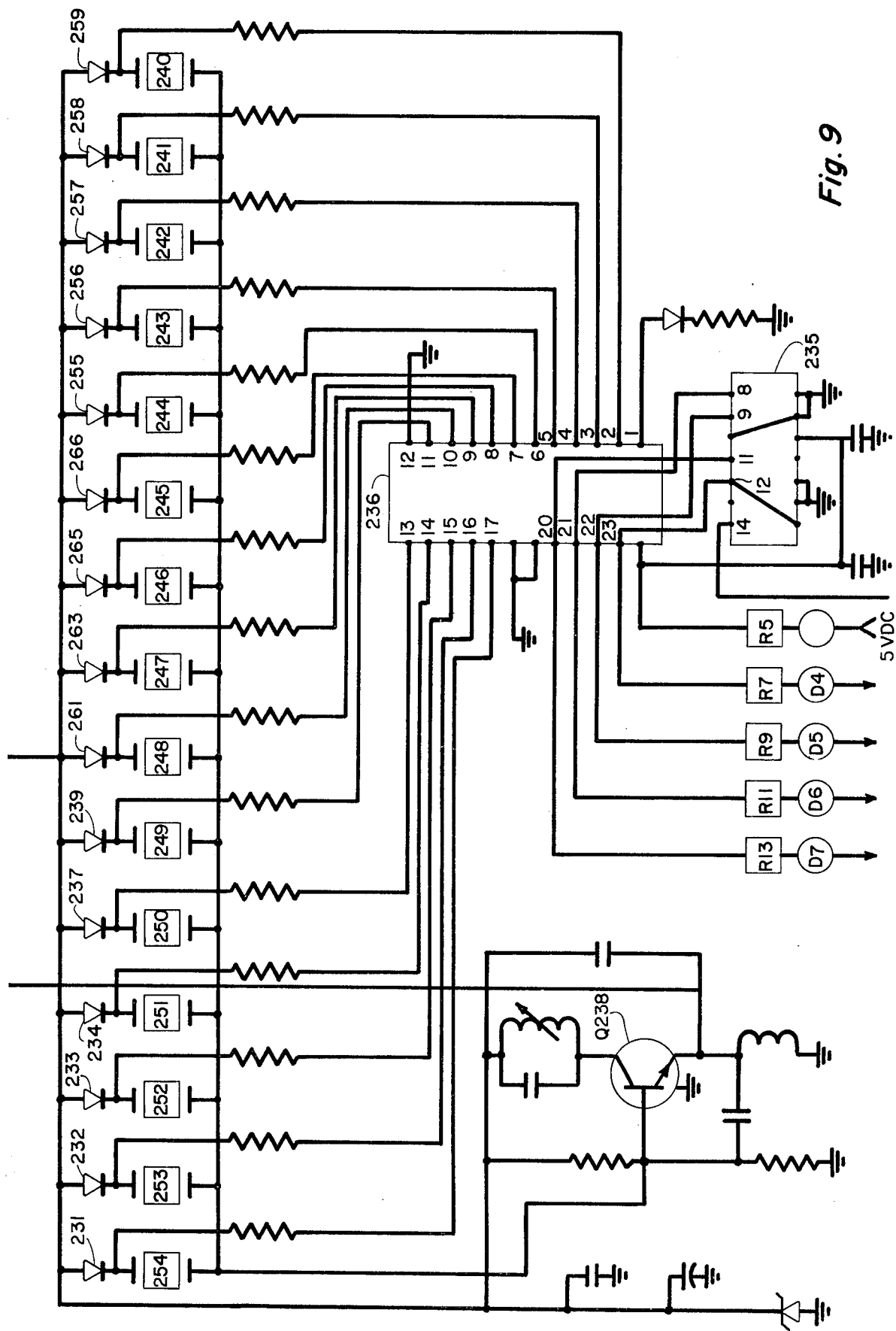
Figure 10:
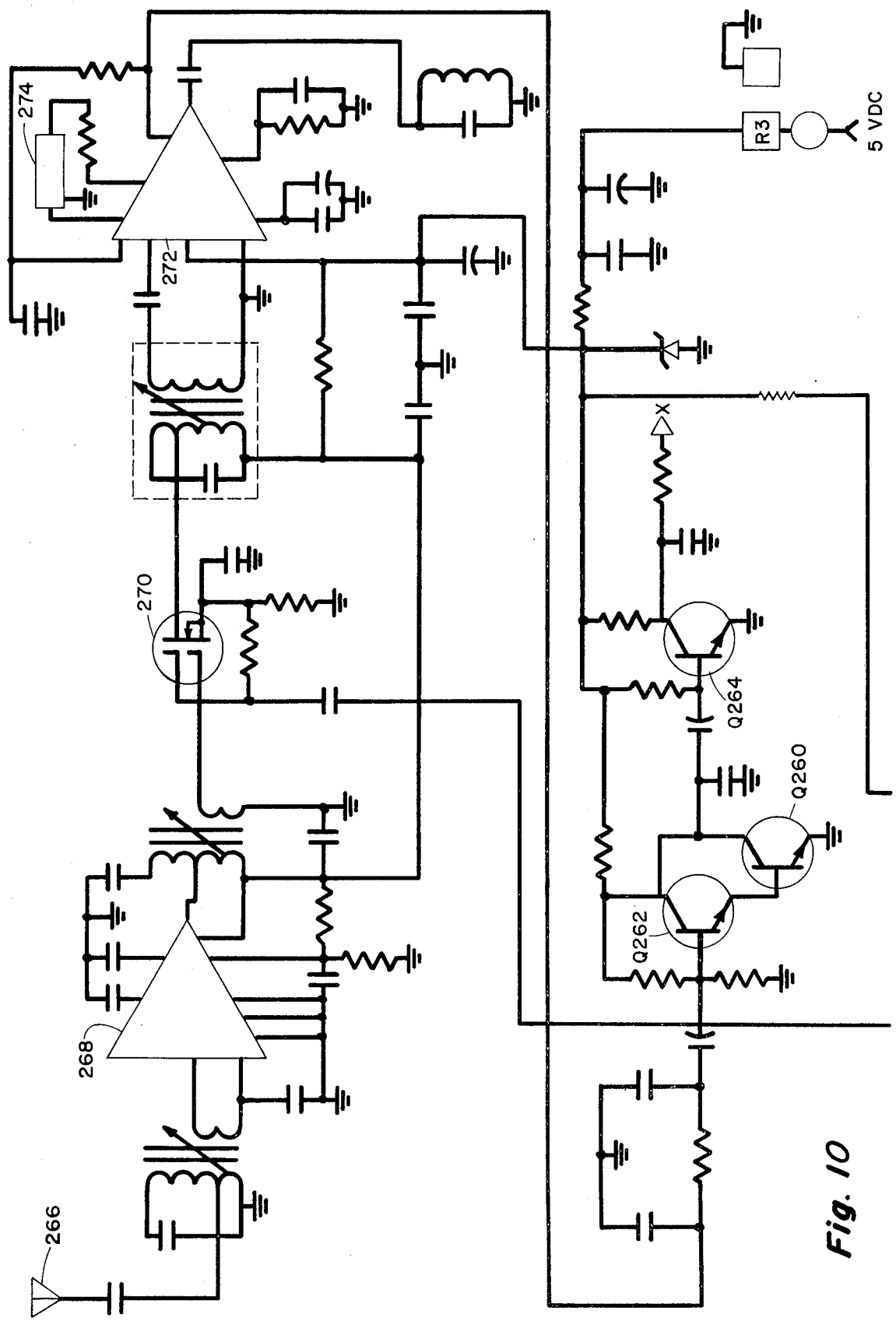
Figure 11:
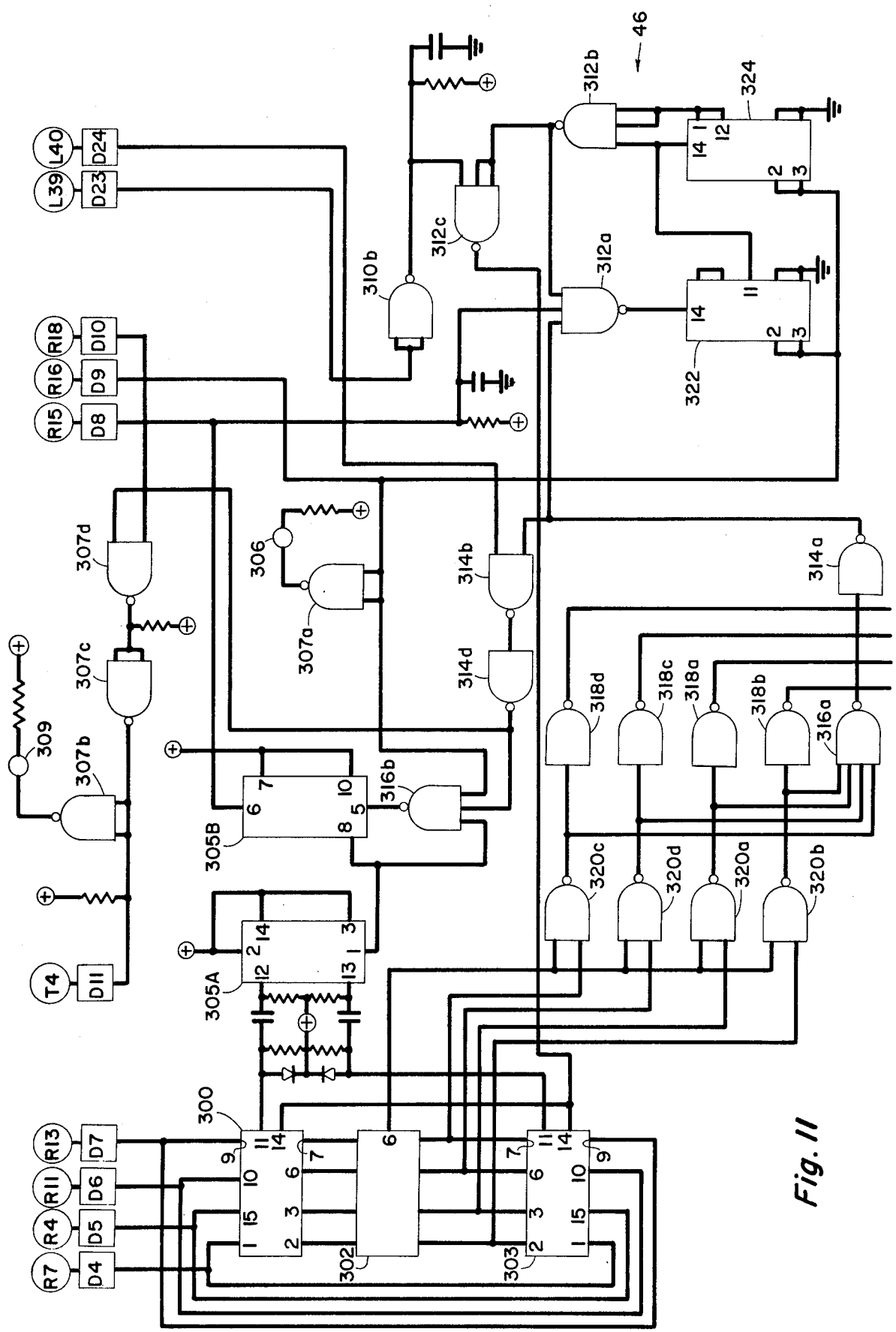
FIGS. 11, 12, and 13, taken in combination, with FIG. 12 placed directly below FIG. 11, and FIG. 13 placed below FIG. 12 and slightly to the right (as determined by the matching of the letter D'), constitute a logic diagram of the animal identification control 46, B.C.D. decoder 52, automatic memory scan 50, and memory address circuit 48 of FIG. 1.
Figure 21:
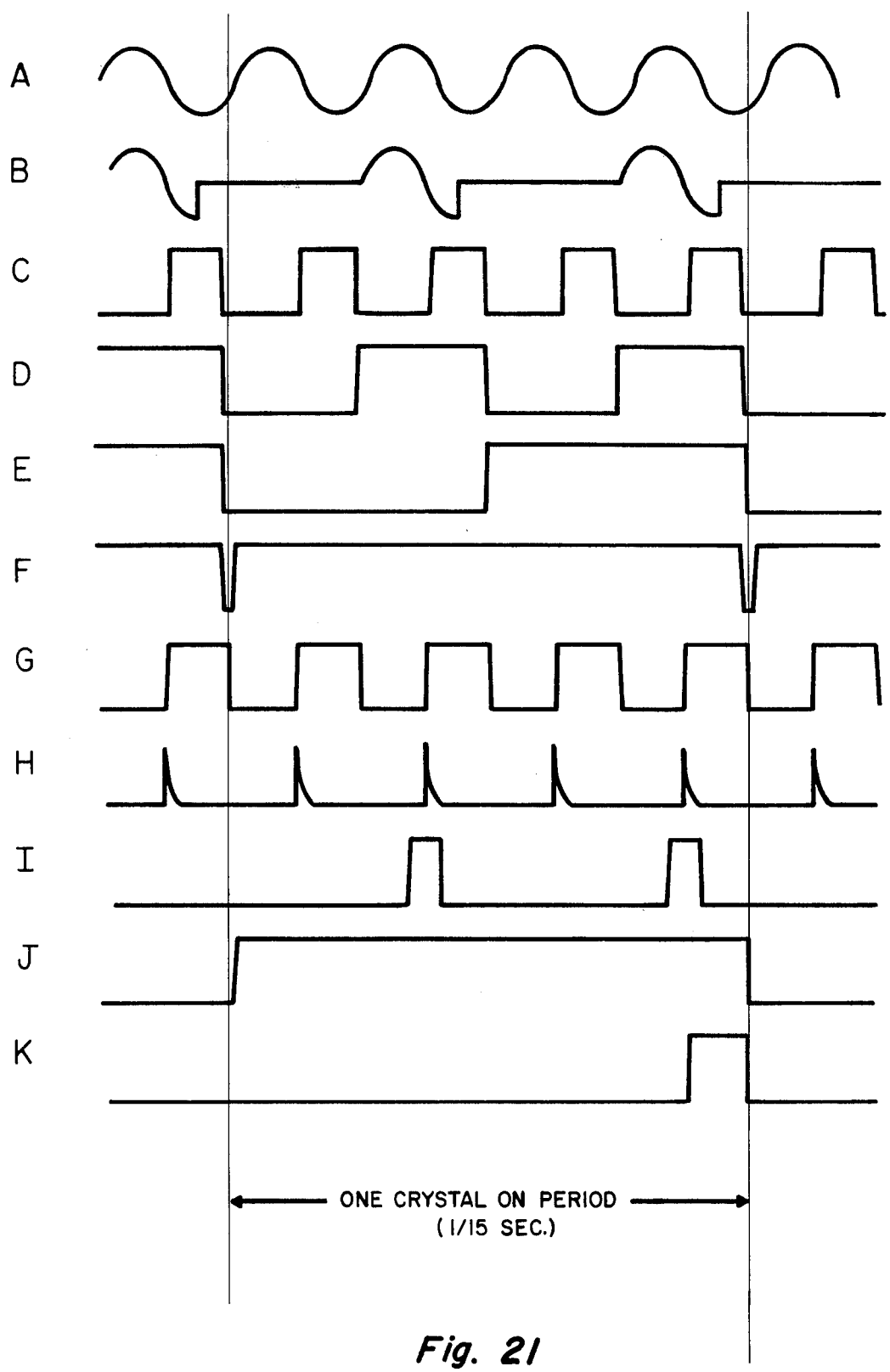
FIG. 21, consisting of A through K, is a set of wave form graphs of various circuit outputs of FIGS. 8, 9, and 10.

The receiver 44 of FIG. 1 is a radio frequency receiver and is diagrammed in FIGS. 8, 9, and 10. Q222 (NPN transistor) (FIG. 8) takes the 18 V.A.C. (wave form A FIG. 21) input from the power source through R20 (discussed in detail hereinafter) and converts the alternating current to a 60 Hz square wave (wave form C FIG. 21) which is the input to pin 1, IC 224 (7473 flip-flop) (FIG. 8) which divides by 2. The output at pin 12,IC 224 (FIG. 8) will be a 30 Hz square wave (wave form D FIG. 21). The square wave goes through connector R18-D10(FIG. 8) to IC 307d (NAND gate) (FIG. 11). Because IC 314d is high (as discussed above), when the square wave from IC 224 (FIG. 8) goes high IC 307d (FIG. 11) will go low. When IC 307d goes low IC 307c (NAND gate used as an inverter) will go high. When the square wave goes low, IC 307d will go high and IC 307c low. IC 307b (NAND gate used as an inverter) again inverts the square wave. IC 307b turns 309 (LED, light omitting diode, panel indicator) on when IC 307b is low. When the output of 307c is high, it activates a solid state relay 480 of FIG. 18 through connection D11-T4. The solid state relay 480 will, when it receives a high signal from IC 307c (FIG. 11) apply power (wave form B FIG. 21) to the interrogation coil 58 (29 inches × 19 inches, 175 turns of No. 15 copper wire). When IC 307c goes low the solid state relay will turn off the interrogation coil 58. The effect is that the interrogation coil will go off and on as the square wave from pin 12 of IC 224 (FIG. 8) goes low and high respectively.

Figure 20:
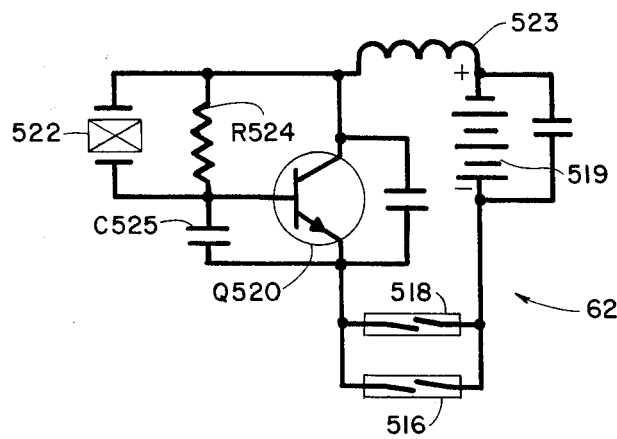
FIG. 20 is a more detailed block diagram of the tag 62 of FIG. 1.

The electromagnetic pulse from the interrogation coil will close one or more reed relays, 518 and 516 (FIG. 20) contained in the tag. All references are to FIG. 20 unless stated otherwise. With 518 and 516 closed, power from the battery 519 is applied to the R.F. oscillator made up of Q520 (NPN transistor), R524 (resistor), 522 (crystal), and 523 (coil). The R.F. pulse, which is emitted as long as the electromagnetic pulse from the interrogation coil 58 holds the reed switch (518 and/or 516) closed, goes to the antenna 266 (FIG. 10) of the receiver. All references to FIGS. 8, 9, and 10 unless stated otherwise. The 30 Hz square wave from pin 12 of IC 224 (as discussed above) is connected to pin 5 of IC 224 (7473 J-K flip-flop) and is divided by two. The output of pin 9,IC 224 is a 15 Hz square wave (wave form E FIG. 21) which goes to pin 14 of IC 235 (7490 counter). The four line binary coded output of IC 235 goes to IC 236 (74154, a four line to sixteen line decoder) and through connectors R13-D7, R11-D6, R9-D5, and R7-D4 to ICs 306 and 303 of FIG. 11 (to be discussed in detail hereinafter). Each time the 15 Hz square wave from pin 9,IC 224 goes low, IC 235 advances one animal identity number from 0 up to 15 and then begins at 0 again. The effect of the 30 Hz and 15 Hz square waves is that when IC 235 advances one address and turns on the next crystal, the interrogation coil 58 is turned off. The interrogation coil is then turned on (1/60 of a second later), then off (1/60 of a second later), then on (1/60 of a second later), and then off again as IC 235 advances to the next address. Pins 1, 2, 3, 4, 5, 6, 7, 8, 9, 10, 11, 13, 14, 15, 16, and 17 of IC 236 are normally high but when the four line binary coded output equals the number represented by the pin, the output goes low. (For example, if the binary was 12, pin 14 would go low.) When the output of IC 236 is high, the associated diodes (231, 232, 233, 234, 237, 239, 261, 263, 265, 266, 255, 256, 257, 258 and 259) will not conduct. When IC 235 is at count 12, pin 14 of IC 236 will go low and 234 (diode) will conduct. This allows Q238 (NPN transistor) to oscillate at a frequency determined by 251 (crystal). When IC 235 advances by one, pin 15 of IC 236 will go low (and pin 14 high) and Q238 will oscillate at a frequency determined by 252 (crystal). As IC 235 advances one count at a time, each crystal 240 through 254 is turned on for 1/15 second. Pin 1 of IC 236 has no crystal. (This is the zero identity storage position to be discussed hereinafter). The output of Q238 is sent to IC 270 (40673, an R.F. mixer). The R.F. pulse from the tag 62 is amplified by IC 268 (MC 1550G). The output of Q238 and IC 268 are mixed by 270 and the resulting intermediate frequency is filtered by 274. A high output of IC 272 amplifier (LM 373H) will occur only when the intermediate frequency produced by the output from the tag and Q238 is correct. The tag crystals and their corresponding receiver crystals have been paired such that each pair will produce substantially the same intermediate frequency. If the oscillating crystal and the tag crystal are not a pair, they will produce an incorrect intermediate frequency and IC 272 will have a low output. If they are a pair, then the high output of IC 272 will be amplified and shaped by Q262, Q260 and Q264 (NPN transistors). This pulse (marked X) is an input to IC 228A and IC 228B.

The receiver logic will now be explained. Pin 13 and 12 of IC 224 are the outputs of one flip-flop. The output of pin 12 will be the inverse of pin 13. The same is true for the output of the other flip-flop, pins 8 and 9, of IC 224. When the 15 Hz square wave of pin 9, IC 224 goes low, IC 235 advances one address and IC 236 will turn on the appropriate crystal (wave form J FIG. 21). The output of pin 8, IC 224 goes high at the same time that pin 9, IC 224 goes low. C223 (capacitor) and R225 (resistor) only allow a positive spike to reach IC 226a (NAND gate used as an inverter). IC 226a will go low for the duration of the positive spike (wave form F FIG. 21). This pulse goes to IC 312a and IC 305B (FIG. 11) through connection R15-D8 and IC 226b (to be described in detail hereinafter). As pin 9, IC 224 goes low, pin 12 of IC 224 goes low and pin 13 goes high (the 30 Hz square wave). Since pin 12 of IC 224 is low, the interrogation 58 is off (as explained above). 1/60 of a second later, pin 12 will go high, turn the interrogation coil on, and apply a high input to 228B.

Q220 (NPN transistor) provides an output (wave form G FIG. 21) similar to the output of Q222. C221 (capacitor) and R227 (resistor) convert the output of Q220 to a series of positive spikes (wave form H, FIG. 21, 60 Hz) which occur only when the output of Q220 goes from low to high. This sampling pulse is an input to IC 228A (NAND gate) and 228B (NAND gate).

When the receiver output (wave form I FIG. 21) goes high (designated as X FIG. 8) and the sampling pulse from Q220 goes high, all four inputs to IC 228B will be high and IC 228B will go low for the duration of the spike. The low signal from IC 228B will set the flip-flop composed of IC 226c and IC 226d. IC 226c will go low and IC 226d will go high. (Pin 12 of IC 224 is high.) The low pulse of IC 226c is counted by IC 230 (7493 counter). When pin 12, IC 224 goes low and turns off the interrogation coil, the low output will reset the IC 226c flip-flop and IC 226c will go high. When the interrogation coil goes on again (pin 12, IC 224 high), and there is a high signal from the receiver, and the sampling pulse goes high, IC 228B will go low and set the flip-flop IC 226c and 226d. IC 226c going from high to low is counted by IC 230. Since the IC 230 has counted IC 226c going from high to low twice, pin 9, IC 230 will go high (wave form K FIG. 21). This high output goes through R16-D9 to IC 316b, IC 307a, IC 322 and IC 324 (FIG. 11) (explained in detail hereinafter), and is a signal to latch the address provided by IC 235 into the memory address. The outputs of pins 9 and 12, IC 224 will go low. The change from low to high at pin 8, IC 224 will produce the short low pulse of IC 226a (discussed above). This puts a low voltage at one of the inputs to 226b (NAND gate) and causes 226b to go high which zeros IC 230. At the same time that pin 8, IC 224 goes high, pin 9, IC 224 goes low and IC 235 will advance one address. Pin 12 of IC 224 will go low and reset IC 226c and 226d flip-flop.

The effect of the zeroing of IC 230 by the pulse from IC 226a is that IC 230 is zeroed each time a crystal is turned on and, therefore, IC 230 can never count past two because IC 228B can only set the IC 226c and 226d flip-flop twice during the on time period of a crystal.

The receiver logic will discriminate against outside R.F. interference. Assuming the R.F. interference has caused a high receiver output and IC 230 has counted one pulse from 226c. When pin 12, IC 224 goes low, turns off the interrogation coil, and resets IC 226c, pin 13, IC 224 will be high. This high output from pin 13, IC 224, with the high output caused by the outside R.F. interference from the receiver will, when the sampling pulse from Q220 goes high, cause IC 228A to go low. This low output from 228A will cause 226b to go high which zeroes IC 230. If the receiver output is high while the interrogation coil is off, IC 230 will not count two and pin 9, IC 230 will not go high, because IC 230 has been zeroed. A high output at pin 9, IC 230 is a signal to the animal identification control that the identity is verified and to latch the address of IC 235 (FIG. 9) into its memory (discussed in detail hereinafter). It is unlikely that the outside R.F. interference will have the same on-off sequence as the interrogation coil and zeroing of IC 230 by IC 226b will prevent an erroneous address latch signal being sent from IC 230 to the animal identification control 46 of FIG. 1.

While power is applied to the apparatus, the frequency scanning is continuous but the 30 Hz square wave from pin 12, IC 224 will turn on the interrogation coil only when the other input to IC 307d (FIG. 11) is high (as discussed above).

FIG. 11 is the animal identification control 46. All references are to FIG. 11, 12, 13 unless stated otherwise.

The effects of the various inputs from the receiver to the animal identification control will now be discussed. When IC 230, pin 9 (FIG. 8) goes high, indicating the identity present in IC 235 (FIG. 9) is verified, the high signal is connected through R16-D9 to the inputs of IC 316b (NAND gate), IC 307a (NAND gate used as an inverter), IC 322 (7490 counter) and IC 324 (7490 counter). Three things will happen. First the high signal from IC 230 (FIG. 8) causes 307a to go low which turns 306 (LED) on.

Second, the high signal will also set IC 322 and IC 324 to zero. Third, IC 316b will go low because pin 9, IC 230 (FIG. 8) is high, IC 314d is high (as discussed above), and pin 8 of IC 305B (7473, J-K flip-flop) is high (to be explained in detail hereinafter). The pulse (indicating the address is being advanced by one and the next crystal turned on) from IC 226a(FIG. 8) is sent through connector R15-D8 to pin 6 of IC 305B. Pin 6 of IC 305B is its clear terminal. With a high signal at pin 5, IC 305B (J-K flip-flop clock input) pin 8 of IC 305B will go low because pin 7 and 10, IC 305B are high. Pin 6, IC 305B will, when it receives the pulse from IC 226a(FIG. 8) indicating that the next crystal has been turned on (wave form F FIG. 21), clear the J-K flip-flop and pin 8 will go high. As pin 8, IC 305B which is connected to pin 1, IC 305A (the J-K clock input) goes low, pin 12, IC 305A will go low and pin 13 will go high because pins 3 and 14 are high. The low signal from pin 12, IC 305A which is connected to pin 11, IC 300 will "latch" the address from IC 235 (FIG. 9) into IC 300 (74192 decade counters). The binary number output to IC 300 at pins 1, 15, 10, and 9 will appear at pins 2, 3, 6, and 7.

The low pulses from IC 226a (FIG. 8) will cause IC 312a (NAND gate) to pulse counts to pin 14, IC 3h2 (7490 counters). When IC 312a receives a low pulse from IC 226a (FIG. 8), it will go high. (IC 314a and IC 312b are high.) IC 322 will continue to count pulses from IC 226a (FIG. 8) until it reaches 8. When IC 322 has counted 8, pin 11, IC 322 goes high. When IC 322 has counted 10 pulses, the output at pin 11, IC 322 goes low. This high to low change is counted by IC 324 (7490 counter). When the count total in ICs 322 and 324 has reached 16, the same address (and crystal) which gave the verification signal should be addressed. If the verification signal is received, IC 322 and 324 are zeroed again (as discussed above) and IC 316b goes low. The low signal from IC 316b causes pin 8, IC 305B to go low again which will cause pin 13, IC 305A to go low. This will means that IC 303 will "latch" the address from IC 235 (FIG. 9). The information at pins 1, 15,10, and 9, IC 303 will appear at pins 2, 3, 6 and 7. The "latched" addresses appear at pins 2, 3, 6, and 7 of ICs 300 and 303. If the addresses in IC 300 and IC 303 are identical, pin 6 of IC 320a (7485 standard comparator) will go high.

If another address is present in IC 303 oher than 0, the high from pin 6, IC 302 will cause one or more of IC 320a, 320b, 320c and 320d (NAND gates) to go low. If IC 303 is not "latched" before the animal leaves, ICs 320a, b, c, and d will all be high which provides a zero address. IC 316a (NAND gate) will go high when it receives one or more low inputs from IC 320 (a, b, c, d). The high signal from IC 316a causes IC 314a (NAND gate used as an inverter) to go low. IC 314a will be high unless an address has been latched into IC 303 and IC 302. The low output of IC 314a does two things. First, IC 314b will go high and, after inversion by IC 314d to a low signal, cause IC 316b to remain high preventing any further pulses to IC 305B and IC 307d to go high and remain high shutting off the interrogation coil. Second, 312a will go high and remain high preventing any further counts being received by IC 322 and IC 324. Once the address in IC 303 has been compared and found to be the same as the address in IC 300, the identification process is terminated unless the address is zero. If this occurs, then IC 314a would continue to be high and the identification process would continue.

If IC 316b, IC 322 and IC 324 do not receive the second verification signal from IC 230 (FIG. 8), IC 322 and IC 324 will continue to count until they reach eighteen. At that time pin 11 of IC 322 and pin 12 of IC 324 will both be high and IC 312b (NAND gate) will go low. The low output of IC 312b does two things. First, IC 312a will go high and remain high preventing any more counts being passed to IC 322. Second, IC 312c (NAND gate) will go high. The high output from IC 312c goes to pin 14, ICs 300 and 303 which will clear the "latches" of IC 303 and IC 300, pins 2, 3, 6, and 7, of any addresses they contain. When a verification signal is again received from IC 230 (FIG. 8), IC 322 and IC 324 are zeroed, IC 312b will go high and IC 312a will pass pulses to be counted by IC 322 and 324.

The addresses from ICs 320 a, b, c, and d goes to ICs 318 a, b, c, and d (NAND gates) where it is reinverted. The address goes to IC 348a, b, c, and d (NAND gates) of the memory address circuit 48. Unless the print cycle has begun (to be explained in detail hereinafter), ICs 332b, and 346a, b, c, and d will be high. IC 332c will be low (to be explained in detail hereinafter). IC 348a, b, c, and d will act as inverters and IC 342a, b, c, and d will reinvert the address. IC 344 a, b, c, and d, and IC 346a, b, c, and d (NAND gates) will be high (to be explained in detail hereinafter). The address is then passed through connectors D36-M26, D33-M29, D34-M28, and D35-M27 to the memory 42 (FIG. 1).

For example, if the address in IC 303 was 0001 (animal identity number 1), pin 2, IC 303 would be high. The high from pin 2, IC 303 and pin 6, IC 302 will cause IC 320b to go low. IC 318b will go high. IC 348 d will go low. IC 338a will go high and this high signal sent to the memory cells through connection D36-M26.

Figure 17:
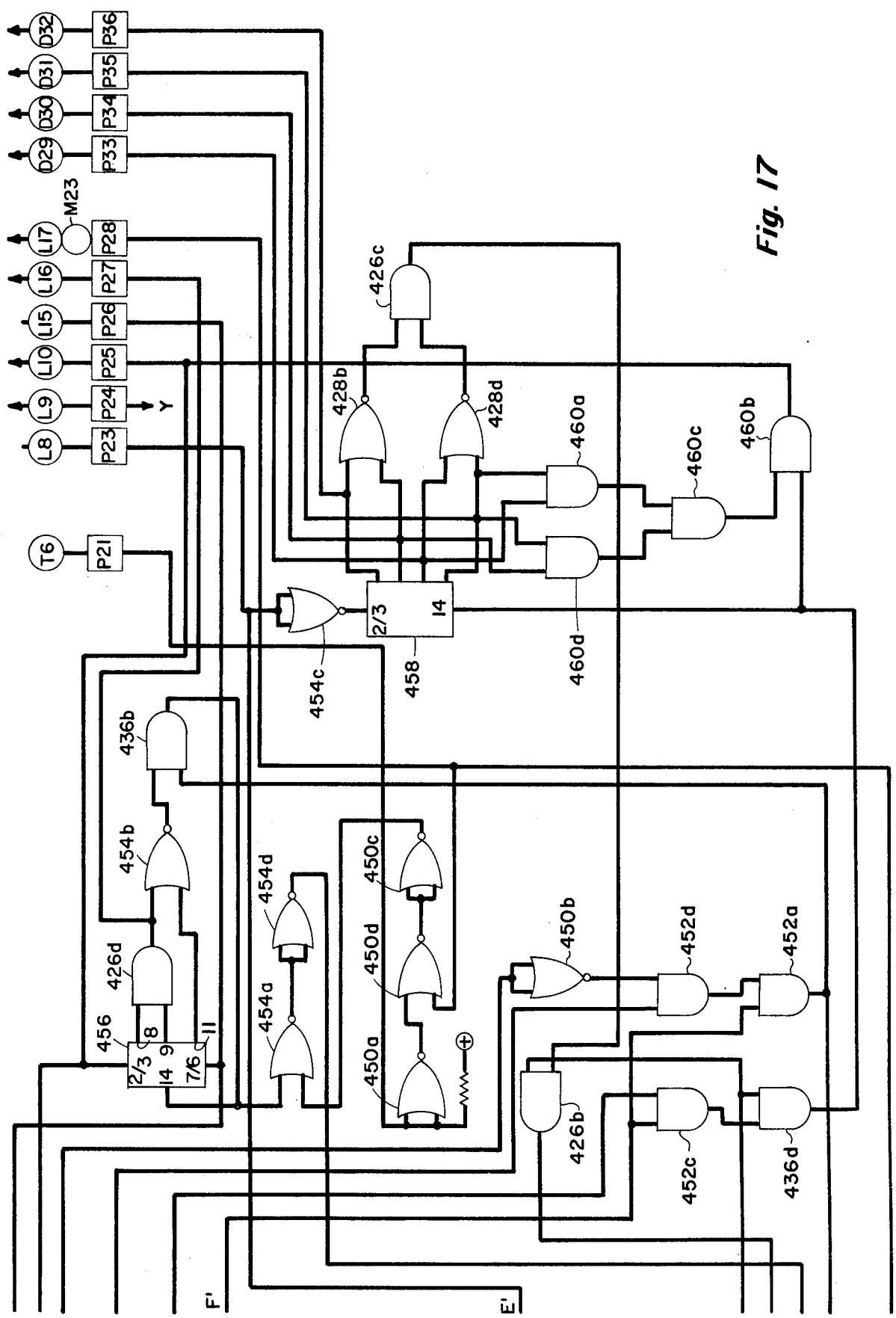

When the animal leaves the feed station 61 (FIG. 1), the beam of light from lamp 60 (Fig. 1) to animal presence sensor 53 (FIG. 1) is remade. All references are to FIGS. 2, 3, 4, and 5 unless stated otherwise. The animal presence sensor 53 (FIG. 1) output goes high, is amplified and causes pin 3, IC 82 to go high (as discussed above). The high output of pin 3, IC 82 and the high of pin 12, IC 160B will cause 158a (NAND gate) to go low. (Pin 12 of IC 160B and pin 8, IC 160A had been high which made IC 164b high. It was the high output of IC 164b which began the animal identification process.) IC 162c will go high and during the next high clock pulse pin 9 of IC 160A will go high and pin 8 of IC 160A will go low. IC 164b will go low shutting off the animal identification process if the animal identification control 46 (FIG. 1) had still been attempting to identify the animal. Since the outputs of pin 12, IC 160B and pin 9, 160A are high, IC 166d (NAND gate) will go low, and IC 166b (NAND used as an inverter) will go high. The high output of IC166b will do two things. First, it passes through L31-D27 to IC 330b(FIG. 17) which inhibits the automatic memory scan 50 of FIG. 1 from operation (to be discussed in detail hereinafter). IC 332b (FIG. 12) is high which allows the address in IC 303 (FIG. 11) to pass to the memory 42 (FIG. 1) (as discussed above). Second, with high outputs from IC 124b of the IC 124a and 124b flip-flop (as discussed above) and IC 166b, IC 118d (NAND gate) will go low. IC 155b (NAND gate used as an inverter will go high. Pin 8 of IC 120A and pin 13 of IC 120B are high (cleared by the power outage detector as discussed above). Since all the inputs to IC 126b are high, it will go low. The low output of IC 126b causes IC 155a to go high starting the scales integrator (as discussed above). IC 116d will be high. (Pin 12, IC 120B is low.) The high outputs from IC 166b and 116d cause 116c (NAND gate) to go low. IC 116a (NAND gate used as an inverter) will go high. During the next clock pulse pin 9, IC 120A will go high and pin 8, IC 120A will go low.

Since pin 8, IC 120 is low, IC 126b will go high and IC 155a will go low shutting off the start signal to the scales integrator. Both inputs to IC 124d, pin 13, IC 120B and pin 9, 120A, are high and 124d (NAND gate) goes low. IC 124c (NAND gate used as an inverter) goes high. The low output of IC 124d goes through connection L34-M34 to pin 11 of ICs 190, 192, 194, and 196 (74192 counters). This is a signal to load the addressed information from the memory, ICs 198, 200, 202 and 204 (7489 memory cells) into ICs 190, 192, 194, and 196 (to be discussed in detail hereinafter). While the scales integrator is operating, IC 130b will be low (as discussed above). IC 112d (NAND gate used as an inverter) goes high. IC 110c (NAND gate) will again cycle high and low inverting the clock pulse. IC 122a (NAND gate), because IC 124c is high, will reinvert the clock pulse. Because the output of IC 122b is high (IC 114b is low and will be discussed herinafter) 126c will invert the clock pulse output of IC 122a and 126a will invert the clock output of 126c. The effect of all these inversions is that IC 126a will cycle high to low as the cycles high to low respectively. The clock pulse output of IC 126a goes through connection L37-M38 to be counted down by the up-down counters, ICs 170, 172, 174, and 176 of FIG. 6. When scales integration is complete, IC 130b will go high; IC 112d will go low; and IC110c will go high and remain high without regard to the clock pulse. Once again, the pulse train represents the weight of feed in the hopper.

The function of the up-down counters 40 will now be explained. All references are to FIG. 6 unless stated otherwise. IC 164a (FIG. 5) is high when there is no animal in the feed station 61 (FIG. 1) and the system control logic 30 is ready to accept another animal. This high signal goes through connector L39-M37 to pin 14 of ICs 170, 172, 174, and 176 (74192 counters) to zero the counters. The pulse train, when the animal enters, goes from IC 110d (FIG. 3) (as discussed above) through connection L38-M39 to pin 5 of IC 176. Each pulse is counted and when IC 176 reaches 9, it sends one pulse to pin 5 of IC 174, returns to zero, and continues to count. The relationship between IC 174 and IC 172, and IC 172 and IC 170 is the same.

When IC 126a (FIG. 3) begins to pulse the weight after the animal leaves, this pulse train goes through connection L37-M38 to pin 4 to IC 176. Each pulse to IC 176 is a down count. When IC 176 reaches zero, it pulses one down count to IC 174, pin 4, goes to 9, and continues to count down, if IC 174 still contains counts. The relationship between IC 172 and IC 174, and IC 170 and 172 is the same. When the down count is completed, the system control logic 30 looks at the output of IC 184a (OR gate) and IC 184b (OR gate). The counts remaining in the up-down counters 40 represent the weight of feed consumed. If there are one or more counts present in ICs 170, 172, 174, and 176, IC 184b (OR gate) will be high. If there are four or more counts in the up-down counters, IC 184a will be high. For example, if the count was four, pin 7, IC 176 would be high. This high output would cause IC 184c (OR gate) to go high. IC 182b (OR gate) would be high. IC 184a would be high and IC 184b would be high. IC 178a, c, and d, IC 180a, b, c, and d, IC 182a, b, c, and d, and IC 184 a, b, c, and d (all OR gates) are arranged such that the output of IC 184b will go low only when the count is IC 170, 172, 174, and 176 is zero and IC 184a (all OR gates) will go low only when the count is three or less. The output of IC 184b goes through connection M32-L26 to IC 114d (NAND gate), IC 110b, and IC 116d (FIG. 3). The output of IC 184b (FIG. 6) goes through connection M33-L27 to IC 118c (NAND gate) (FIG. 3).

With the scales integration complete, IC 130b (FIG. 4) will go high, and if IC 184b (FIG. 6) is high, 114d (FIG. 3) (NAND gate) will go low. References are to FIGS. 2, 3, 4, and 5 unless stated otherwise. IC 116b (NAND gate used as an inverter) will go high. If IC 184a (FIG. 6) is high, IC 118c will be low and cause 118b to go high. Also, since pin 9, IC 120A and IC 130b are high, IC 110a (NAND gate) will be low. IC 110b (NAND gate) will be high. Since both IC 166b and IC 110b are high, 112a (NAND gate) will go low. IC 112b (NAND gate used as an inverter) will go high. At the end of the next clock pulse pin 12 of IC 120B and pin 8 of IC 120A will go high. Pin 9 of IC 120A and pin 13 of 120B will go low. With pin 12, IC 120B and pin 8, IC 120A high, IC 114a (NAND gate) will go low. IC 114a going low will cause IC 114b (NAND gate used as an inverter) to go high. The high output from IC 114b and the 100 KHz clock pulse input will cause 122b (NAND gate) to cycle inverting the clock pulse. This inverted clock pulse goes through L36-M24 to the up counters 41 (to be discussed in detail hereinafter). IC 122a is high because 124d is high (its inputs are off) and 124c is low. The high output of 122a allows 126c to cycle with the clock. IC 126a (NAND gate used as an inverter) inverts the clock pulse output of IC 126c. The inverted clock pulse goes through connection L37-M38 to the up-down counters to be counted down (as discussed above).

When IC 184b (FIG. 6) goes low (indicating that the up-down counters are at zero), IC 116d (NAND gate) will go high. Since IC 166b and IC 116d are high, 116c will go low. IC 116a (NAND gate used as an inverter) will go high. When the clock pulse next begins to go low, pin 9 of IC 120A will go high and pin 8, IC 120A will go low. A low output from pin 8, IC 120A will cause IC 114a to go high; IC 114b will go low; and IC 122b will remain high and not pass anymore clock pulses.

If IC 184a (FIG. 6) remains low after the down count is completed, pin 8, IC 120A will remain low and pin 9, IC 120A will remain high, when IC 120B, pin 12 goes high, because IC 118c will remain low. The logic sequence for both IC 184a (FIG. 6) hih and IC 184a low will be identical after pin 9, IC 120A and pin 12, IC 120B are both high.

Because pin 9, IC 120A and pin 12, IC 120B are high, IC 114c (NAND gate) will go low. This low output of 114c does two things. First, IC 122d (NAND gate) will go high. IC 122c (NAND gate used as an inverter) will go low. This low output will reset the IC 124a-124b flip-flop with IC 124a high and IC 124b low. Second, IC 102a (NAND gate) will go high and, when the inverted clock pulse from IC 130d (NAND gate used as an inverter) goes high, IC 103b will go low. This low signal goes to pin 3 of IC 198, 200, 202 and 204 (FIG. 7), the memory 42. Upon receiving this low pulse at pin 3, ICs 198, 200, 202 and 204 will "write" the information in ICs 190, 192, 194, and 196 (FIG. 7), up counters 41, into the addressed memory cells.

Since pin 9 of IC 160A and IC 124a are high, IC 156c (NAND gate) will go low. IC 156a (NAND gate used as an inverter) will go high. Since pin 12, IC 160B and IC 124a are high, IC 166a (NAND gate) will go low. IC 164c (NAND gate) will go high. This will apply a high input to pin 3, IC 160B and pin 10 of IC 160A. Pins 3 and 14, IC 120B and pins 7 and 10 of IC 120A have high inputs. When the clock pulse next begins to go low four things happen. First, pin 13 of IC 160B will go high and in 12, IC 160B will go low. Second, pin 8 of IC 160A will go high, and pin 9, IC 160A will go low. Third, since pin 12 of IC 120B is high and pin 13 is low, the high inputs to pins 3 and 14, IC 120B will cause pin 13 to go high and pin 12 to go low. Fourth, since pin 8, IC 120A is low and pin 9 is high, the high inputs to pins 7 and 10, IC 120A will cause pin 9 to go low and pin 8 to go high. The master control logic has returned to its original state and is prepared for the next animal entry. ICs 160A, 160B, 120A and 120B and the flip-flop (IC 124a and 124b) are in the same state that they were set to by the power outage detector. (The power outage detector will be discussed in detail hereinafter.)

Because pin 13, IC 160B and pin 8, IC 160A are high, IC 162b (NAND gate) will be low. The low output of IC 162b will cause IC 164a (NAND gate used as an inverter) to go high. This high signal does three things. First, it goes through connection L39-M37 to pin 14 of the up-down counters 40, ICs 170, 172, 174, and 176 (FIG. 6) which will zero the up-down counters. Second, the high output of IC 164a goes through connection L39-D23 to IC 310b (NAND gates used as an inverter) (FIG. 11). The low output of IC 310b causes IC 312c (NAND gate) to go high which "unlatches" the I.D. memory ICs 300 and 303 (FIG. 11). Third, the high output goes to ICs 86a and 90c which allows the print cycle to begin (discussed in detail hereinafter).

Figure 7:
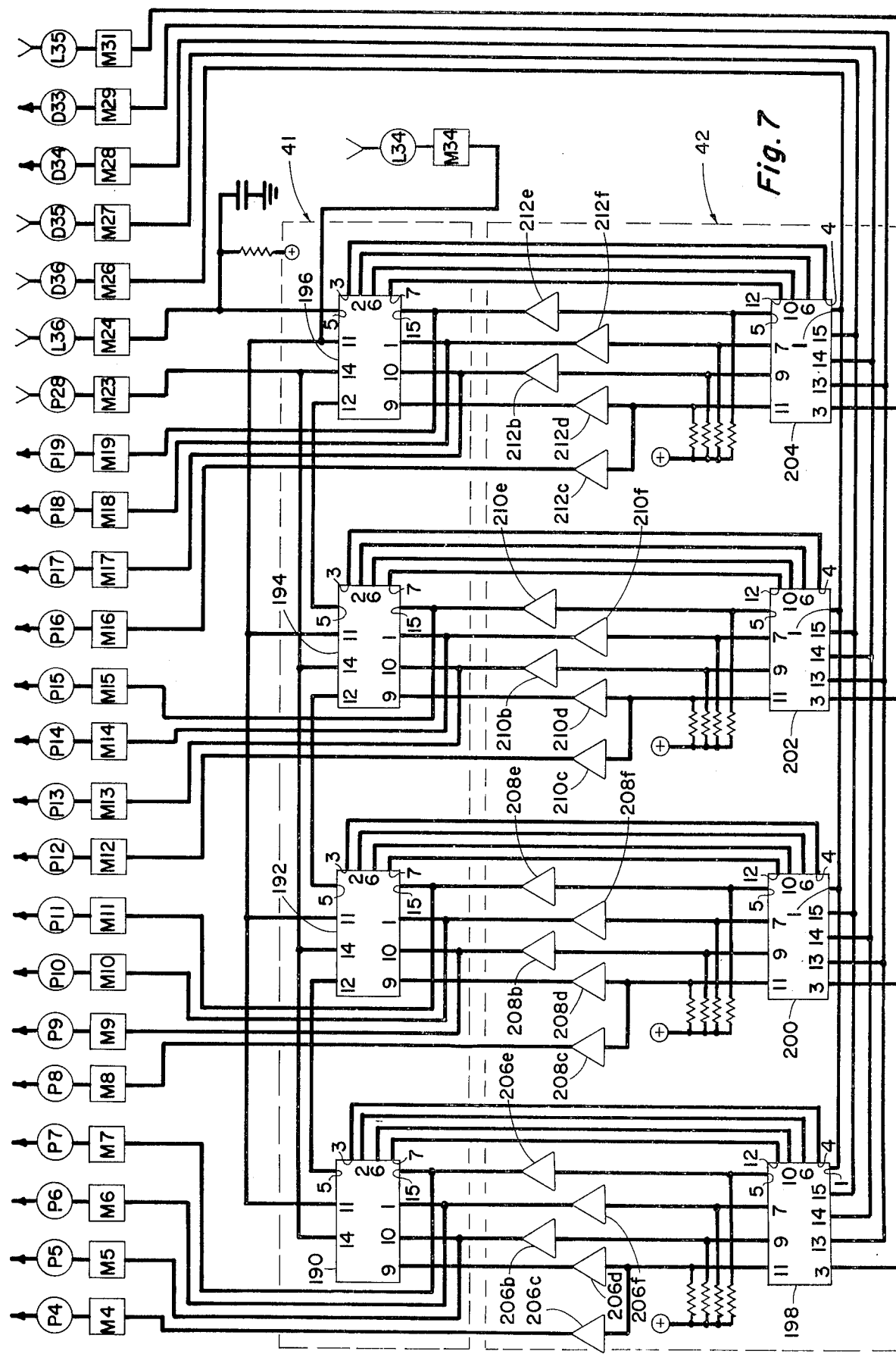
FIG. 7 is a logic diagram of the up counters 41 and memory 42 of FIG. 1.

The memory 42 and the up counters 41, which are diagrammed on FIG. 7, will now be discussed. The memory address comes from IC 338a, IC 342b, IC 342c and IC 342d (FIG. 12) through connections D36-M26, D35-M27, D34-M28 and D33-M29 to pins 13, 14, 15 and 1 of ICs 198, 200, 202 and 204 (7489-16×4 memory chips). The information at pins 13, 14, 15 and 1 informs the memory chip which of the sixteen 4 bit memory units are to be used. The cumulated weight contained in the addressed 4 bit memory unit appears in an inverted form at pins 11, 9, 7 and 5 of ICs 198, 200, 202 and 204. The information is inverted by ICs 206b, c, d, e, and f, 208b, c, d, e, and f, 210b, c, d, e, and f, and 212b, c, d, e, and f, (all inverters) into a usable form. Once the proper 4 bit memory unit is addressed and the output inverted, the low output from IC 124d (FIG. 3) to pin 11, ICs 190, 192, 194, and 196 will cause the output of ICs 198, 200, 202, and 204 after passing through the inverters to be "loaded" into the up counters, ICs 190, 192, 194, and 196 at pins 9, 10, 1, and 15. The inverted 100 KHz clock pulses from IC 122b (FIG. 3) go through connection L36-M24 to pin 5 of IC 196. Thus, when the up count is over, the cumulation of what was in the memory and the weight consumed will be in ICs, 190, 192, 194, and 196. When IC 196 reaches 9, it sends an up count to IC 194 and goes to zero and continues to count. The relationship between IC 194 and IC 192, and IC 192 and IC 190 is the same. When IC 103b (FIG. 3) goes low, this low signal goes through connection L35-M31 to pin 3 of IC 198, 200, 202, and 204. The cumulation output from pins 3, 2, 6, and 7 of ICs 190, 192, 194 and 196 (connected to pins 4, 6, 10 and 12 of ICs 198, 200, 202 and 204) will be written into the addressed 4 bit memory unit in IC 198, 200, 202 and 204. The "write" address is the same as the "load" address. The addressed information in the memory, which is inverted by ICs 206, 208, 210 and 212 (b, c, d, e, and f) goes through sixteen connections M4-P4 through M19-P19, to the printer circuit 54 and incandescent display 56 (to be discussed in detail hereinafter).

The power outage detector 38 will now be discussed. All references are to FIG. 2 unless stated otherwise. The power outage detector 38 operates when the apparatus is turned on or external power is restored to the apparatus after the auxiliary power supply 494 (battery) (FIG. 18) has run down to less than 3 volts. IC 98 (NE 555) observes the voltage on pin 2 of IC 98 supplied by voltage divider R99 (resistor) and R97 (resistor) and compares it to the voltage on pin 8, IC 98. The voltage on pin 2 is normally one-half the voltage on pin 8. When the normal 5 volt supply voltage is restored to the system, pin 9 rises immediately whereas the voltage on pin 2 comes up slower due to the time constant provided by R99, R97 and C101 (capacitor). When the voltage at pin 2, IC 98 is less than two-thirds that of pin 8, IC 98, the output at pin 3 of IC 98 goes high for the duration of the time constant determined by R104 (resistor) and C105 (capacitor). In the event of a momentary line drop, 106 (diode) will pull the voltage across C101, pin 2, IC 98, down to approximately six-tenths of a volt above that of the voltage on pin 8, IC 98. When the voltage on pin 8, IC 98 returns to normal, if the voltage across C101, pin 2, IC 98 was pulled below two-thirds that of the normal voltage on pin 8, IC 98, pin 3, IC 98 will go high for the duration of the time constant determined by R104 and C105.

Figure 14:
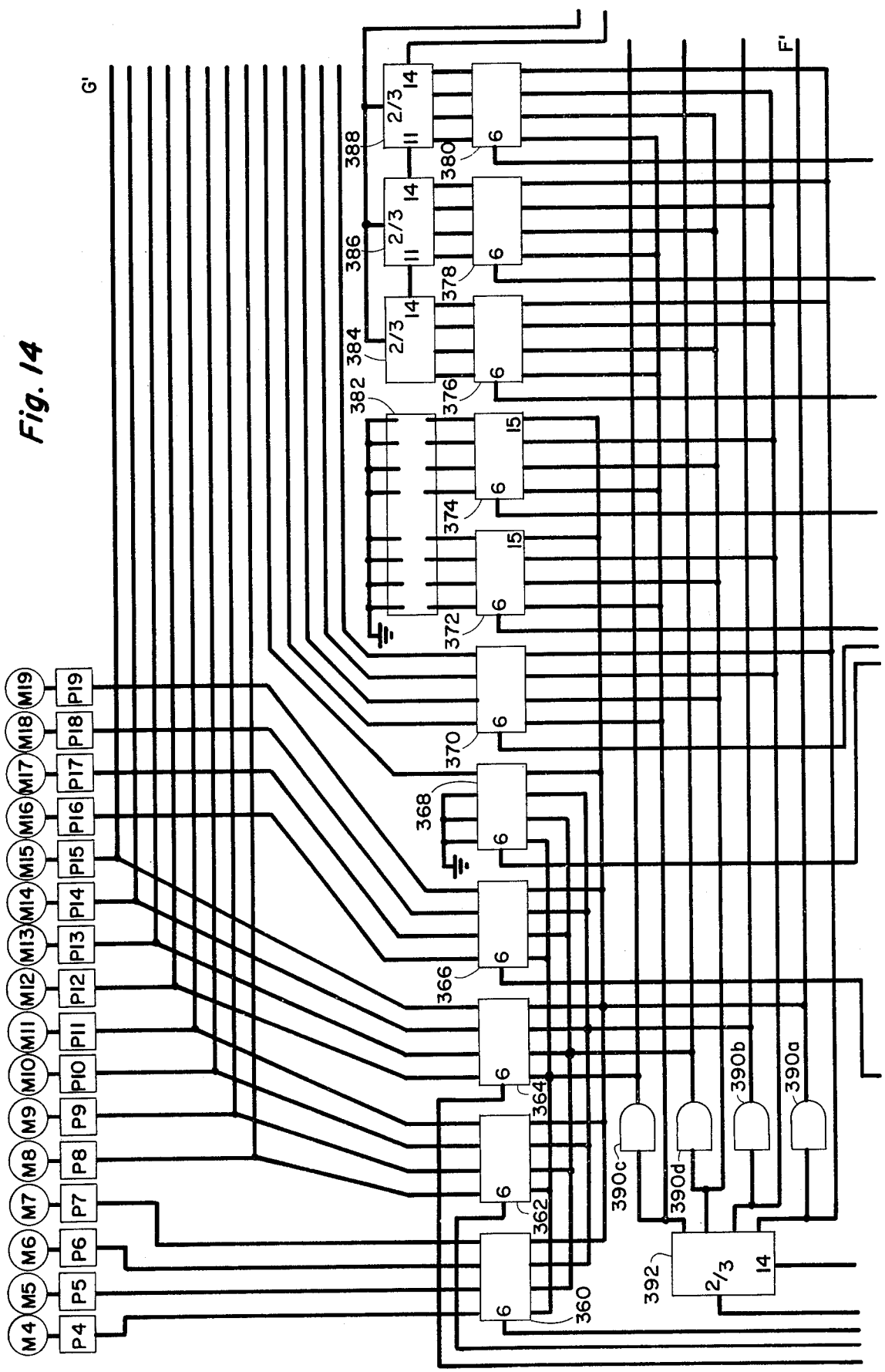
FIGS. 14, 15, 16, and 17, taken in combination with the bottom half of FIG. 15 placed to the right of FIG. 14, FIG. 16 placed directly below FIG. 14, and FIG. 17 placed to the right of FIGS. 14 and 16 with outputs aligned (as determined by the matching of letters E' through G'), constitute a logic diagram of the printer circuit 54 and incandescent display 56 of FIG. 1.
Figure 15:
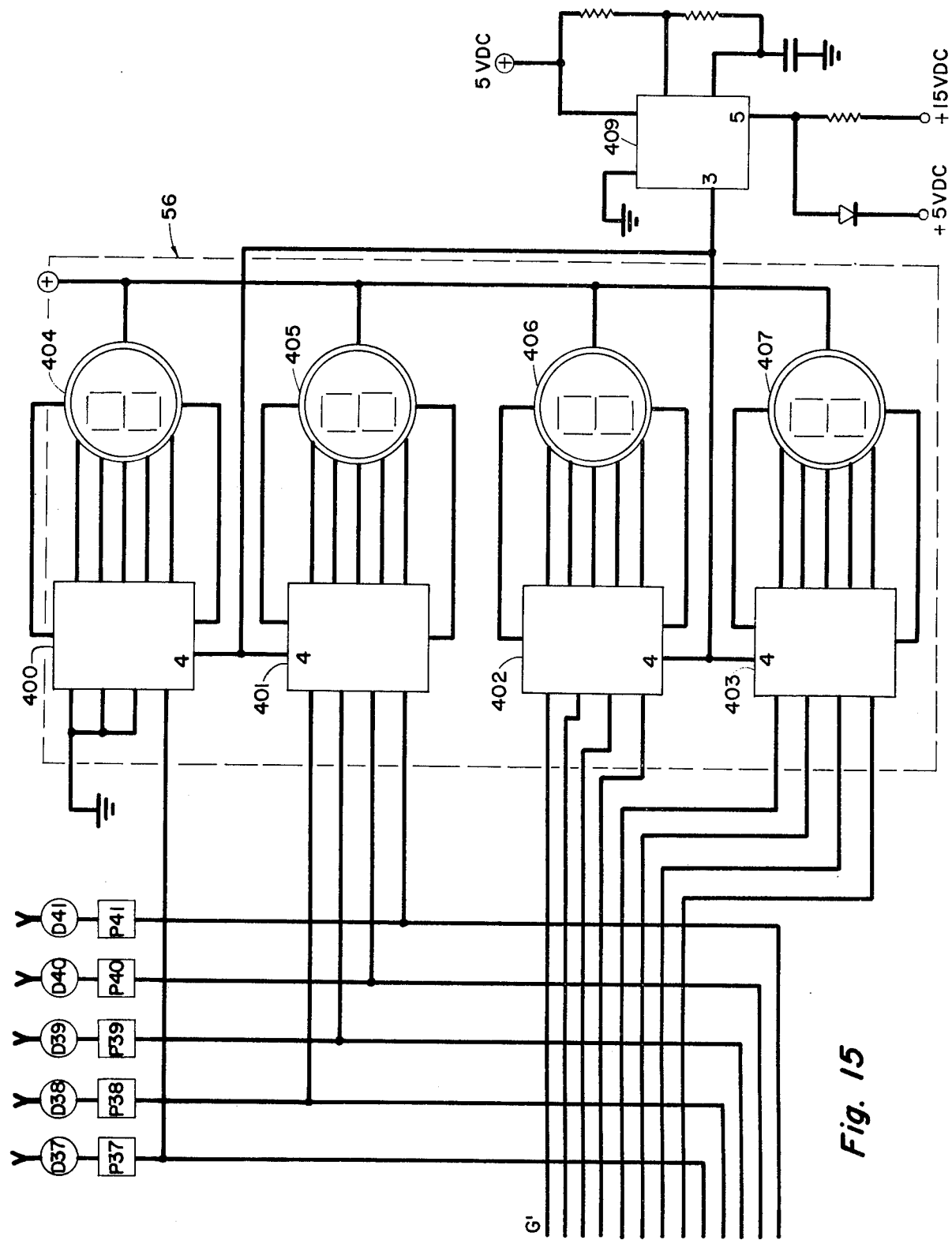

The high output of pin 3, IC 98 goes to IC 96c (NAND gate uses as an inverter). The low output of IC 96c goes to IC 122d (FIG. 3), IC 96b (NAND gate), IC 88A, 88B, 120A, 120B, 160A, and 160B (J-K flip-flops) (FIGS. 2, 3, and 5). The high output of IC 98, pin 3 goes through connection L15-P22 to IC 456 (FIG. 17) and ICs 384, 386, and 388 (FIG. 14) (to be explained in detail hereinafter). IC 122d will go high and IC 122c will go low resetting the IC 124a-124b flip-flop with IC 124b low and IC 124a high. Also, this low pulse applied to pin 2 of ICs 88B, 120B and 160B (clear input of J-K flip-flop) will cause pin 9 to go low and pin 8 to go high. The low pulse applied to pin 6, ICs 88A, 120A and 160A (clear input of J-K flip-flop) will cause pin 13 to go high and pin 12 to go low. The low pulse to IC 96b will being the print cycle.

The print cycle is initiated by the 24 hour clock switch 488 (FIG. 18) which connects an input of IC 96b to ground through connection T8-L14 or by the power outage detector (as discussed above). IC 96b will go high. The high output from 96b does two things. First, it goes to IC 102c (NAND gate used as an inverter). The low output of IC 102c will set the IC 102d-100b flip-flop. IC 102d will be high and IC 100b will be low. Second, the high output from 96b when applied to pins 2 and 3, IC 94 will zero IC 94 (7490-counter).

Figure 16:
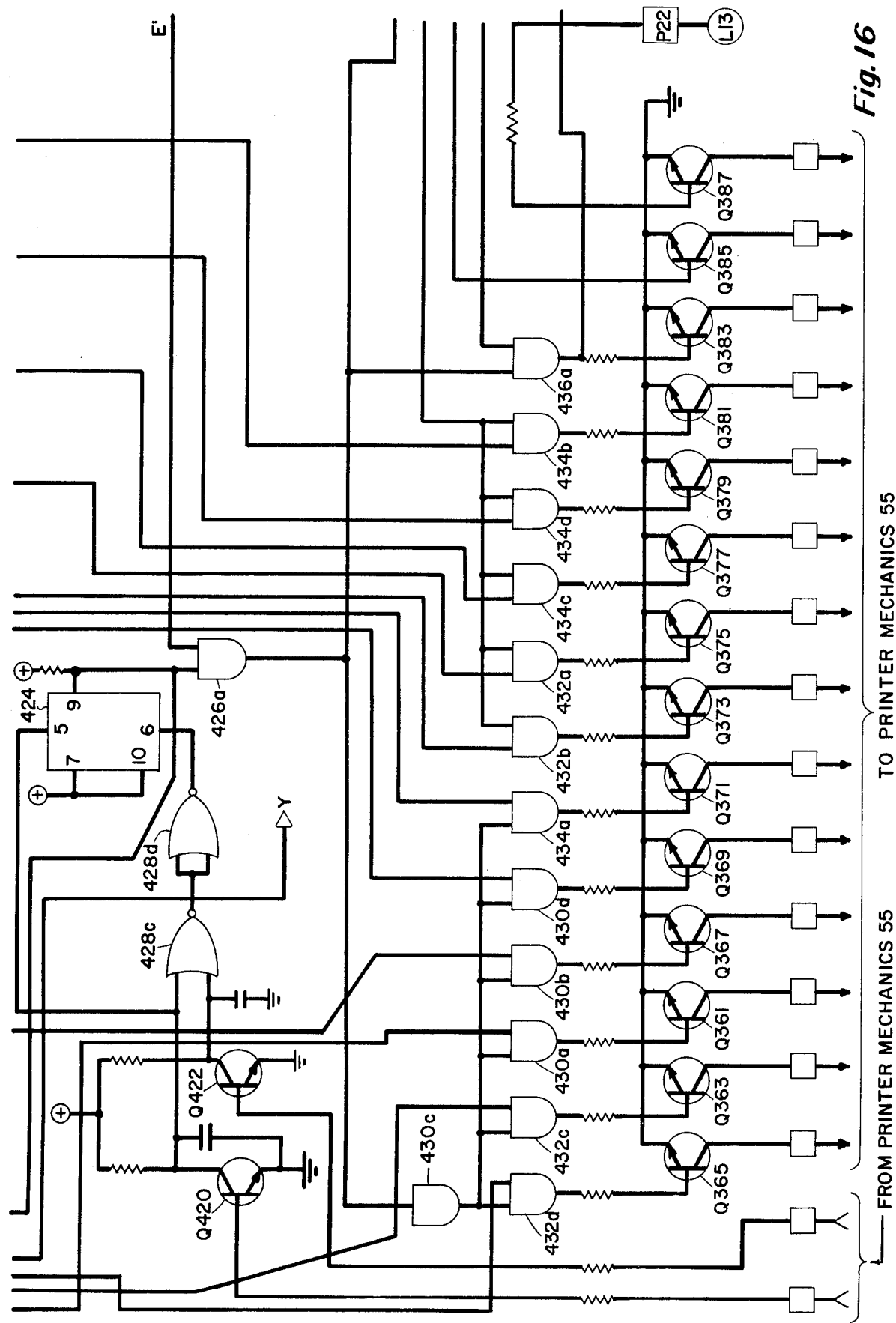

The low output of IC 100b (flip-flop) causes IC 103a (NAND gate) to go high. The high output of 103a goes through L13-P22 to Q387 (NPN transistor) (FIG. 16). Q387 goes low and turns on the printer motor (not shown). The printer mechanics 55 (not shown in detail) is a standard flying drum printer. The printer circuit 54 is diagrammed on FIGS. 14, 16, and 17.

The printer mechanics 55 has two outputs to FIG. 16. The output which is conneted to Q420 (NPN transistor) (FIG. 16) sends pulses when the printer drum (not shown) is in position to print and when the printer drum begins to change positions. The input to Q422 (NPN transistor) indicates when the printer drum has completed a cycle. Q420 and Q422 amplify the printer mechanics outputs. When the motor is turned on the printer drum beings to cycle and sends out pulses to Q422 and Q420. When the pulses are received by Q422 and Q420 their outputs go low. IC 428c (NOR gate) (FIG. 16) will go high when both Q420 and Q422 are low. The high output from IC 428c goes through connnection P24-L9 (FIG. 17), (The diagram connection from IC 428c to P24-L9 is designated Y.) to IC 90c, IC 86a and IC 96a (FIG. 2). IC 96a (NAND gate) (FIG. 2) will go low. All references are to FIG. 2 unless stated otherwise. These low pulses are counted by IC 94 (7490 counter) at pin 14. When four pulses have arrived which indicates that the motor is up to speed, pin 8, IC 94 will go high. The high output pin of 8, IC 94 does four things.

First, IC 92b (NAND gate used as an inverter) will go low. IC 92d (NAND gate) will go high. IC 92c (NAND gate used as an inverter) will go low. The low output from IC 92c will prevent IC 96a from passing any further pulses from the printer circuit 54. IC 96a will go high and remain high. Second, since pin 13, IC 88B and pin 8, IC 94 are high, IC 90d (NAND gate) will go low. IC 90b (NAND gate used as an inverter) will go high. During the next 100 KHz clock pulse, pin 9, IC 88A will go high and pin 8, IC 88A low. Third, if IC 164a (FIG. 5) is high indicating that there is not an animal present in the feed station 61 (FIG. 1) and the system control logic is ready for another animal entry, IC 86a (NAND gate) will go low during the next clock pulse after the next pulse arrives from IC 428c (FIG. 16). IC 86b (NAND gate used as an inverter) will go high. During the next 100 KHz clock pulse, pin 12, IC 88B will go high and pin 13, IC 8B will go low. Fourth, if IC 164a is high, pin 8, IC 88A will go high and pin 9, IC 88A will go low when pin 12, IC 88B goes high, because IC 90c (NAND gate) will be low and IC 90a (NAND gate used as an inverter) will be high.

If there has been an animal in the feed station or the system control was not yet ready to accept another animal, IC 164a would have been low and the change of pin 12, IC 88B and pin 8, IC 88A from low to high would have been delayed until after IC 164a went high. When IC 164a went high, the next pulse from IC 428c (FIG. 16) would cause IC 86b and IC 90a to go high and during the next clock pulse pin 12, IC 88B and pin 8, IC 88A would go high. The high output of pin 12, IC 88B is the signal for the print cycle to begin.

If an animal enters after pin 12 goes high, pin 13, IC 88B is low and this low signal causes IC 158a (FIG. 5) to remain high preventing the system control logic 30 from taking action after the animal leaves. The animal's identity will be stored in IC 303 (FIG. 11) and the weight of food in the hopper when the animal entered will be stored in the up-down counters 40.

The output of pin 12, IC 88B does three things. First, it causes IC 110d (NAND gate used as an inverter) to go low. IC 100c (NAND gate) will be high if either pin 8, IC 88A or IC 100d are low. If 100c is high, 100a (NAND gate used as an inverter) is low. This acts as a safety device in the event that the IC 100b-102d flip-flop is reset by noise (random signals). Second, the high at pin 12, IC 88B goes through L8-D28 to IC 310a, and ICs 346a, b, c, and d, (all NAND gates) (FIG. 12) (to be explained in detail hereinafter). Third, the high output of IC 88A, pin 12 goes through connection L8-P23 to IC 454c (NOR gate) (FIG. 17) and IC 426c (AND gate) (FIG. 16).

The first line printed will be the zero identity, the weight of feed consumed stored in memroy 42 (FIG. 1) for the zero identity, the machine's number, and the day of test. All references are to FIGS. 14, 15, 16 and 17 unless stated otherwise. For example, assuming that the weight is 001.3, the machine's identity is 01, and the test day is 003, the line would be printed in the following manner. When the pulse from IC 428c occurred, it not only allowed pin 12, IC 88B (FIG. 2) to go high, it also went to pins 2 and 3, IC 392 (7493 counter) to zero IC 392, and IC 428d (NOR gate used as an inverter). IC 428d went low. The low output of IC 428d went to the clear input of IC 424 (7473 J-K flip-flop) which set pin 9, IC 424 low.

The output of Q420 goes to the clock input, pin 5, of IC 424. Because the J-K inputs of IC 4224, pins 7 and 10, are tied to high, when the output of Q420 is high and begins to go low (indicating that the printer drum is positioned to print zeros), pin 9, IC 424 will go high. IC 426a will go high. (The other input of IC 426a is pin 12, IC 88B which is set and will remain high until the print cycle is completed.) IC 430c (AND gate used as a line driver) will go high. Because IC 426c (AND gate) is high (to be explained in detail hereinafter), IC 426b (AND gate) will go high.

ICs 360, 362, 364, 366, 368, 370, 372, 374, 376, 378, and 380 (7485 comparators) have the weight (360, 362, 364 and 366), identity (368 and 370), machine's identity (372 and 374) and test day (374, 376 and 378) as one set of inputs and the output of IC 392 as the other. The output of IC 392 goes to ICs 390a, b, c, and d (all AND gates used as line drivers) for use by ICs 360, 362, 364, 366 and 368, and pin 15, ICs 372 and 374.

When pin 9, IC 424 goes high, the output of IC 392 is zero. Pin 6 on all the comparators with zero as both inputs will be high. In the example, this would be pin 6 on ICs 360, 362, 368, 370, 372, 376 and 378. ICs 32d, 432c, 430d, 434a, 432b, 434c and 434d will go high. The associated NPN transistors, 432d-Q365, 432c-Q363, 430d-Q369, 434a-Q371, 432b-Q373, 434c-Q377, and 433d-Q379, will go low and the printer mechanics 55 will print zeros in the appropriate columns. Q420 will go high and then low indicating the printer drum is moving out to the next position. Pin 9, IC 424 will go low. IC 426a will go low. The high to low change of pin 9, IC 424 is counted by IC 392. IC 392 will have an output of one (0001 binary). Pin 6 of any comparator with 1 as the other input will go high. In the example, pin 6 of IC 364 and IC 374 will go high.

Q420 is high and, as it goes low, pin 9, IC 424 will go high. IC 430a and 432a will go high; and Q361 and Q375 will go low. The printer mechanics 55 will print ones in appropriate columns. The process will continue. When the output of IC 392 is 3, pin 6,, ICs 366 and 380 will go high; ICs 430b and 434b will go high. Q397 and Q381 will go low. The printer mechanics 55 will print threes in the appropriate columns. The printer drum will continue to more and IC 392 will continue to count. When the printer drum is in position 10 (the count in IC 392 is 10), the output of IC 390c (AND gate) is low. IC 450b (NOR gate used as an inverter) will go high. IC 390d will be high and IC 452d will go high. IC 390a is high. Since both inputs to IC 452a are high, IC 452a (AND gate) will go high. This indicates that the count is 10. IC 436a (AND gate) will go high and Q383 will go low when pin 9, IC 424 goes high. The printer mechanics 55 will print a decimal point in the appropriate column.

Figure 6:
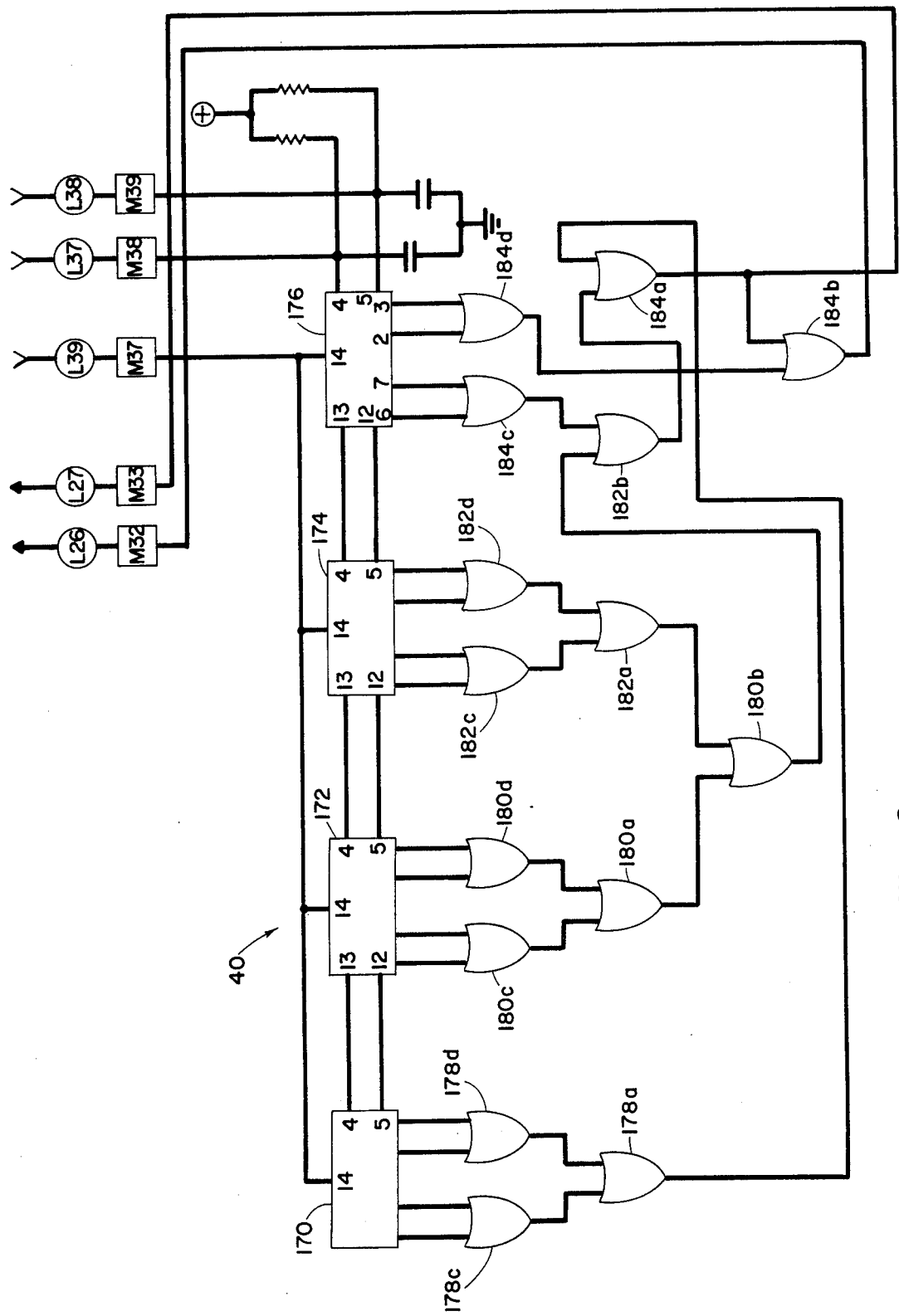
FIG. 6 is a logic diagram of the up-down counters 40 of FIG. 1.

The high output of IC 436a does three other things. First, IC 450d (NOR gate) will go low which will cause IC 450c (NOR gate used as an inverter) to go high. IC 454a (NOR gate) will go low, and IC 454d (NOR gate used as an inverter) will go high. The output of IC 454d will cause Q385 to go low and the printer mechanics 55 will skip a line. Second, the high output goes through P28-M23 to zero the up counters 41, pins 14, IC 170, 172, 174 and 175 (FIG. 6). Third, the high output of IC 452a goes through connection P28-L17 to IC 103c (NAND gate used as an inverter) (FIG. 3). IC 103c goes low which causes IC 102a (NAND gate) (FIG. 3) to go high. When the inverted clock pulse from IC 130d (NAND gate used as an inverter) (FIG. 3) goes high, IC 103b will go low. The low output of IC 103b goes through connection L35-M31 to pin 3 of ICs 198, 200, 202, and 204 (FIG. 7). The low signal at pin 3 will cause the zeros in the up counters 41 to be "written" into the addressed memory bits.

IC 392 (FIG. 16) will continue to count. When IC 392 reaches 12, IC 452c (AND gate) will go high. (ICs 390a and 390b are high.) IC 436d will go high when IC 424, pin 9 goes high. The high pulse of IC 436d is counted by IC 458 (7490 counter). When Q422 and Q420 goes low again (indicating the printer drum is moving to poition 0), IC 428c will go high and zero IC 392. IC 458 now has an address of one.

Figure 12:
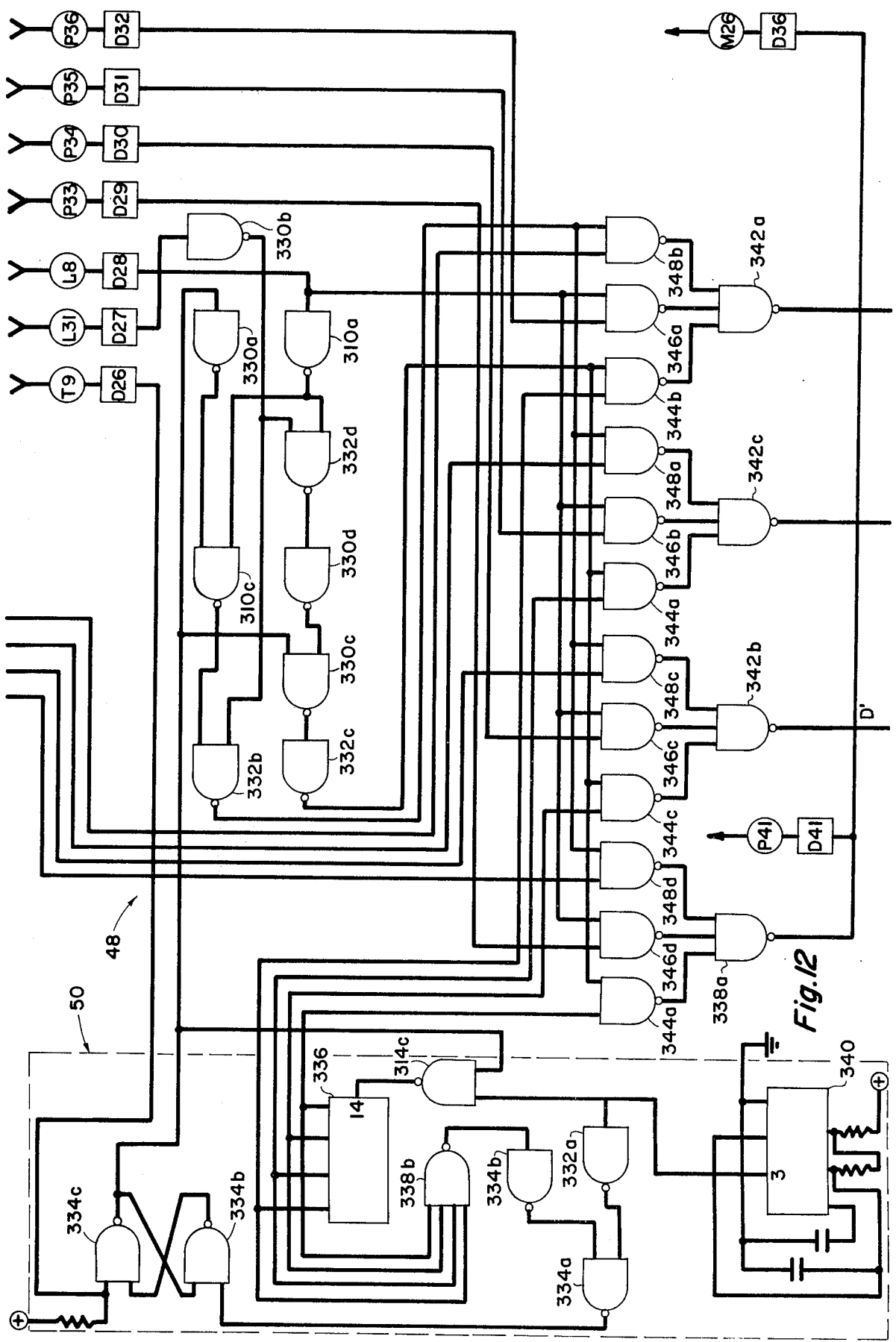
Figure 13:
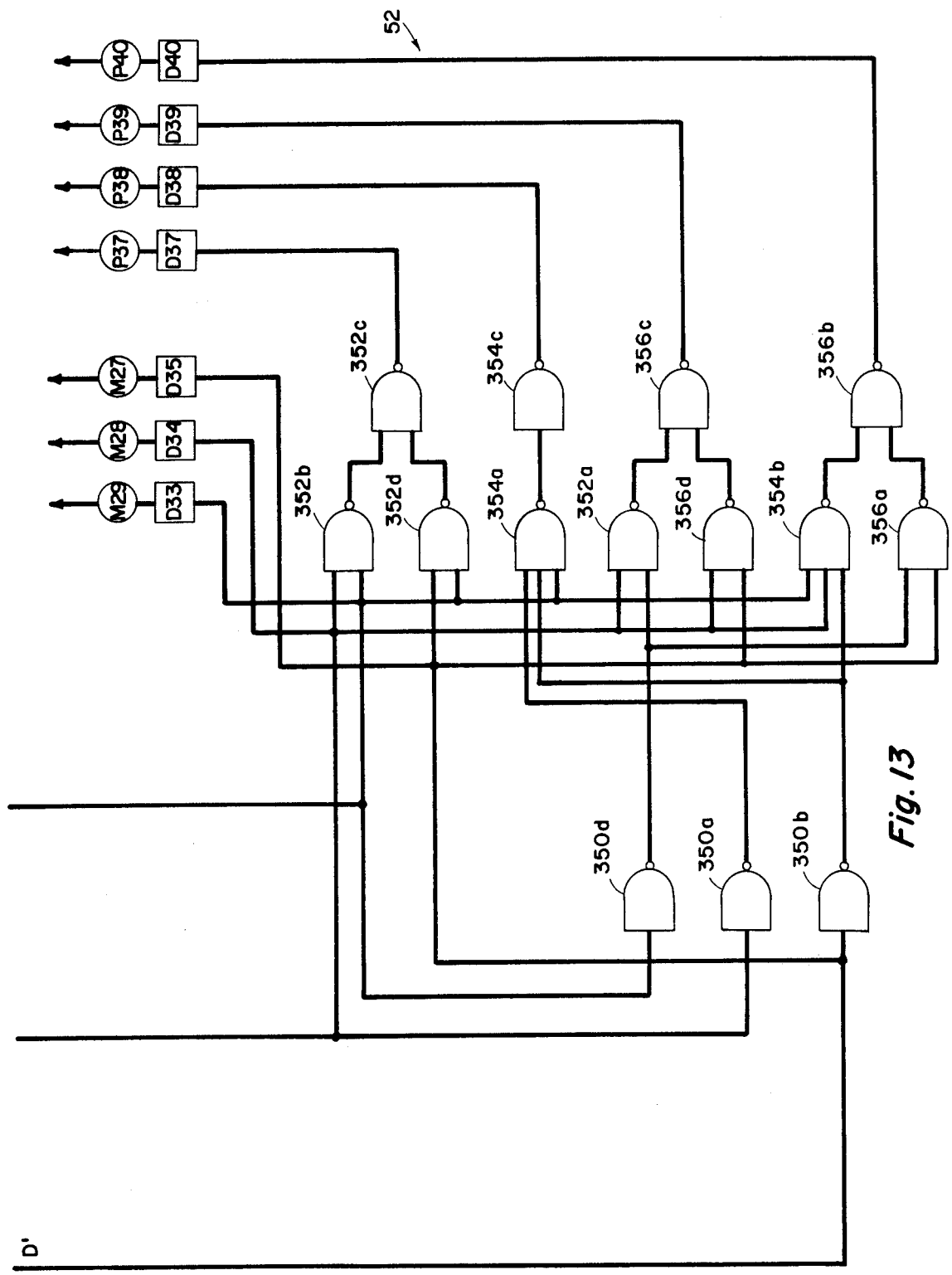

The output of IC 458 is sent through P33-D29, P34-D30, P35-D31 and P36-D32 to ICs 346a, b, c, and d (all NAND gates) (FIG. 12). Since pin 12, IC 88B (FIG. 2) is high, ICs 346a, b, c, and d act as inverters and ICs 342a, b, c, and d reinvert. (ICs 332b and 332c (FIG. 2) will be low. IC 166b (FIG. 5) cannot go high after the print cycle has begun.) This is the address which is sent (as discussed above) to the memory chips, ICs 198, 200, 202 and 204 (FIG. 7). FIG. 13 is the BCD decoder 52. ICs 350a, b, d, 352a, b, c, d, 354a, b, c, 356a, b, c, and d decode the pure binary into a binary coded decimal and send it throgh D37-P37, D38-P38, D39-P39, D40-P40 and D41-P41 to ICs 368 and 370 (FIG. 14), and ICs 400 and 401 (FIG. 15) (to be explained in detail hereinafter). The addressed informat from the memory 42, ICs 190, 200, 202 and 204 goes to ICs 360, 362, 364 and 366 (FIG. 14) through connectors M4-P4 through M19-P19. The weight of the addressed animal identity is printed out (as discussed above). 382 is a set of switches which are set either to high or low. The binary number output of 382 is the machine's number and it is printed out as discussed above. When the power outage detector sends it high pulse from IC 98 (FIG. 2) to pin 14, ICs 384, 386 and 388 (7490 counters), they are set to zero. The outputs of ICs 384, 386 and 388 are connected to ICs 376, 378 and 380 (7485 comparators) and the test day is printed out (as discussed above). When IC 388 is at 9 and another count arrives (to be explained in detail hereinafter), pin 11, IC 388 goes high, IC 386 will advance one count, and IC 388 will go to zero. The relationship between IC 386 and IC 384 (7490 counter) is the same.

If the output of IC 458 is other than zero, IC 428b and/or IC 428d (both NOR gates) will be low. IC 426c (AND gate) will be low preventing the machine's number and the test day from being printed except on the first line because IC 426b will be low.

When IC 458 reaches an address of 15 (15 lines have been printed), IC 460a and 460d (both AND gates) will be high. IC 460c (AND gate) will go high. When IC 436d goes high indicating that the 16th line has been printed, IC 460b (NAND gate) goes high. The high output of 460b does three things. First, the high input to pins 2 and 3, IC 456 will zero IC 456 (7490 counter). Second, the high input to pin 14, IC 388 will cause IC 388 to advance one test day. Third, the high output of IC 460b goes through connection P25-L10 to pins 6 and 7, IC 94 (FIG. 2). All references are to FIGS. 2, 3, 4 and 5 unless stated otherwise. This will set pin 8, IC 94 to zero and pin 11, IC 94 high. The low output of pin 8, IC 94 is inverted by IC 86c (NAND gate used as an inverter) and during the next 100 KHz clock pulse IC 88B, pin 13 will go high and pin 12 will go low. IC 88A and IC 88B are the same state as they were by the power outage detector.

Since pin 12, IC 88B is low, IC 426a (FIG. 16) will not pass any further high outputs from pin 9, IC 424 (FIG. 16) and nother further will be printed. However, IC, 103a is still high and Q387 (FIg. 16) will be low and the motor is still on.

All references are to FIGS. 14, 15, 16 and 17 unless stated otherwise. IC 428c will go high as the printer mechanics 55 cycles. This will zero IC 392 and it will continue to count. The zeros at pins 8, 9, and 11 of IC 456 will cause 426d (AND gate) to go low. IC 454b (NOR gate) will be high. When IC 392 reaches a count of 10, IC 452a will go high (as discussed above). IC 436b (AND gate) will go high. This high output does two things. First, IC 456 will be advanced one count. Second, IC 454a (NOR gate) will go low and cause IC 454d (NOR gate used as an inverter) to go high. The output of Q385 will go low and the printer mechanic 55 will skip a line. This process will repeat until after six counts. After six counts pins 8 and 9 of IC 456 are high, IC 426d will go high. This high output of IC 426d does two things. First, IC 454b will go low preventing any further counts being passed to IC 456 through IC 436b or line skip pulses going to 454a. IC 454b will be low and prevent IC 436b from going high until IC 456 is zeroed by IC 460b. When IC 98 of the power outage detector 38 (FIG. 2) sent out its high pulse to pins 7 and 6, IC 456, IC 456 was set with pin 11 high; this had the effect of setting the output of IC 454b low until IC 456 was zeroed.

Second, the high output of IC 426d goes through P27-L16 to C107 (capacitor) (FIG. 2). The low to high pulse will pass through C107 and 102a (NAND gate used as an inverter) (FIG. 2) will go low. All references are to FIG. 2 unless stated otherwise. This will reset the IC 102d-100b flip-flop with IC 100b high and IC 102d low. With pin 12, IC 88B low, IC 100d will be high. The other input to IC 103a is tied to high unless the electronic equipment door (not shown) is opened (to be explained hereinafter). With both IC 100d and pin 8, IC 88A high, IC 100c will be low. IC 100a will be high. With all three inputs IC 103a will be low. The low ouput goes through connection L13-P22. Q387 will go high and shut off the printer motor. The apparatus has returned to the same state it was in before the print cycle began.

When the door to the electronic equipment is open, the door switch 472 (FIG. 18) is switched to ground. This low voltage goes through T7-L12 to IC 103a and will pull an input to IC 103a low. IC 103a will go high and turn on the printer motor (as discussed above). When the printer skip switch (not shown) is depressed, it pulls the inputs to IC 450a (NOR gate used as an inverter) (FIG. 17) low through connection T6-P21. IC 450a will go high and IC 450d will go low. This will cause the printer mechanics 55 to skip (as discussed above).

When the automatic scan switch 470 (FIG. 18) is depressed, it is switched to ground. This low voltage goes through T9-D26 to pull an input to IC 334c (NAND gate) (FIG. 12) low. All references are to FIGS. 12 and 13 unless stated otherwise. This low input to IC 334c will set the flip-flop composed of IC 334c and IC 334b (both NAND gates) with IC 334c high and IC 334b low. The high output of IC 334c is inverted by 330a (NAND gate used as an inverter) and causes IC 310c to go high. When the system control logic is not preparing to utilize an animal address from IC 303 (FIG. 11), IC 330b (NAND gate) will be high and IC 332b will go low. If the print cycle is not in operation, IC 310a (NAND gate used as an inverter) will be high. IC 332d (NAND gate) will be low. IC 330c (NAND gate) will go low when IC 334c goes high. IC 332c (NAND gate used as an inverter) will go high. If either the print cycle should begin or the system control logic requires the memory address in IC 303 (FIG. 11), IC 332c will go low and the automatic memory scan will be disabled. If the print cycle begins, IC 310a will go low. IC 332d will go high. IC 330d will go low. IC 330c will to high and IC 332c will go low. If IC 166b (FIG. 5) is high (indicating the master logic requires the memory address in IC 303 (FIG. 11), IC 330b will go low. IC 332b will o high. IC 332d will go high. IC 330d will go low, IC 330c will go high and IC 332c will go low.

IC 340 (NE 555) is an astable mulivibrator. When IC 340 goes high and IC 334c is high, IC 314c (NAND gate) will go low. These low pulses are counted by IC 336 (7493 counter). When IC 336 reaches 15, 1111 binary, IC 338b (NAND gate) will go low. IC 334b (NAND gate used as an inverter) will go high. When IC 332a (NAND gate used as an inverter) is high during the following low pulse, IC 334a (NAND gate) will go low and reset the IC 334b-334c flip-flop with IC 334c low and 334b high. The low output from IC 334c ends the automatic memory scan. The binary address in IC 336 is inverted by ICs 344a, b, c, and d (all NAND gates) because IC 332c is high. The address is reinverted by ICs 342a, b, c, and d. The address goes to the memory 42 and the binary coded decimal decoder 52. Any address being used by the system control logic 32, or generated by the automatic memory scan 50 or the printer circuit 55 also goes through the BCD decoder and will be displayed by the incandescent display 56 along with the addressed weight in the memory chips. ICs 400, 401, 402, and 403 are B-C-D to seven segment decoder-drivers (7446). 404, 405, 406 and 407 (FIG. 15) are standard seven segment filament display tubes. (All references are to FIG. 15 unless stated otherwise.) IC 400 will receive either a 0 or 1. This is the most significant digit of the animal's identity. IC 401 will have the least significant digit of the animal's identity as an input. IC 403 and IC 402 will receive as inputs the two middle digits of the weight in the addressed memory bits, ICs 200 and 202 (FIG. 7) respectively. The animal's identity will be displayed by 404 and 405. The corresponding middle two digits of weight will be displayed by 406 and 407. Thus the automatic memory scan 50 allows the memory 42 to be checked without initiating the print cycle.

When the external power is off, pin 5, IC 409 (NE 555 - astable multivibrator) will go low. Pin 3, IC 409 will go alternatively high and low. The pulses from IC 409 go to pin 4 of ICs 400, 401, 402 and 403. The pulses at pin 4, ICs 400, 401, 402, and 403 cause all of the outputs of ICs 400, 401, 402 and 403 to go high when the pulse goes low. When the pulse is high, IC 400, 401, 402 and 403 function normally. When all the outputs of IC 400, 401, 402 and 403 are high, all of the segments of 404, 405, 406 and 407 will be off. Thus 404, 405, 406, and 407 will flash off and on until the battery 494 (FIG. 19) runs down or external power is restored.

Figure 18:
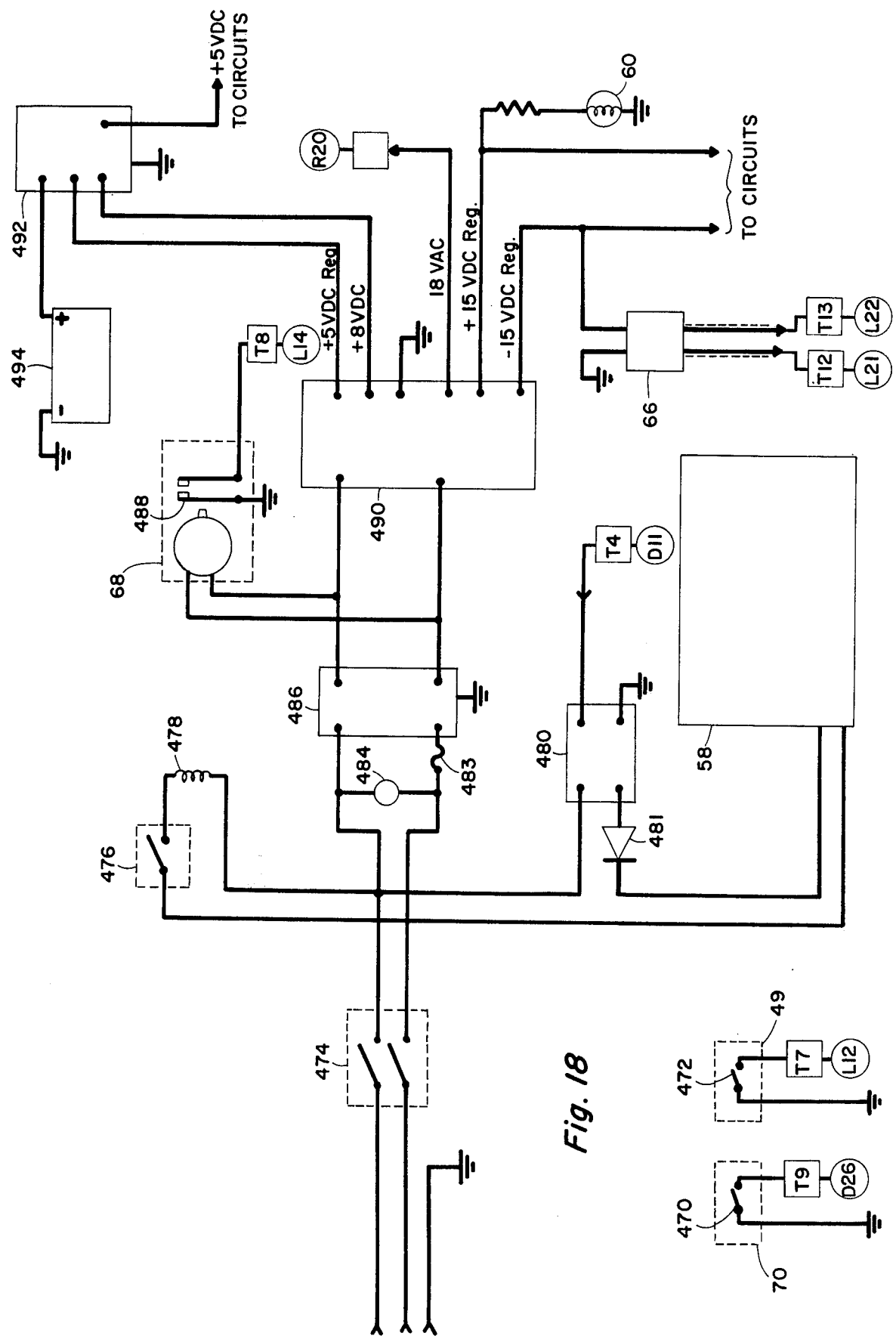
FIG. 18 is a more detailed block diagram of the interrogation coil 58, lamp 60, scan switch 49, door switch 70, scales load cell 66, and 24 hour clock 68 of FIG. 1, and a block diagram of the power supply of the apparatus.

FIG. 18 illustrates the primary power circuit and miscellaneous other connections. Power switch 474 supplies power to the entire system. Thermostat 476 will provide power to heater coil 478 when the temperature inside the equipment compartment is sufficiently low to make it necessary. The varistor 484 protects the systems from transient line spikes on the 120 VAC line. Solid state relay 480, activated by IC 307c of FIG. 11, supplies power to interrogation coil 58 after being rectified by diode 481 (wave form B FIG. 21). Fuse 483 is to protect the DC power supply 490 and the circuits connected to it. Line filter 486 filters the 120 VAC supply before it reaches DC power supply 490 and twenty-four hour clock 68. The 24 hour clock 68 triggers an internal switch 488 once a day, the output of which goes through connection T8-L14 to IC 96b (FIG. 2). The DC power supply 490 provides 5VDC regulated and +and − 15 VDC regulated to the circuits described above. In addition, the −15 VDC line is used to excite the scales load cell 66 (SSM-1000) whose output is connected to pins 1 and 3 of IC 138 (FIG. 4) through connections T12-L21 and T13-L22. The +15 VDC line is also used to activate lamp 60. The 18 VAC supply from the DC power supply 490 is used to synchronize receiver 44 and goes to connection R20 (FIG. 5). The +5 VDC regulated and +8 VDC source from DC power supply 490 is fed into battery charger and auxiliary supply switch 492, the latter also being fed by battery 494. The battery 494 acts an auxiliary power supply.

Figure 19:
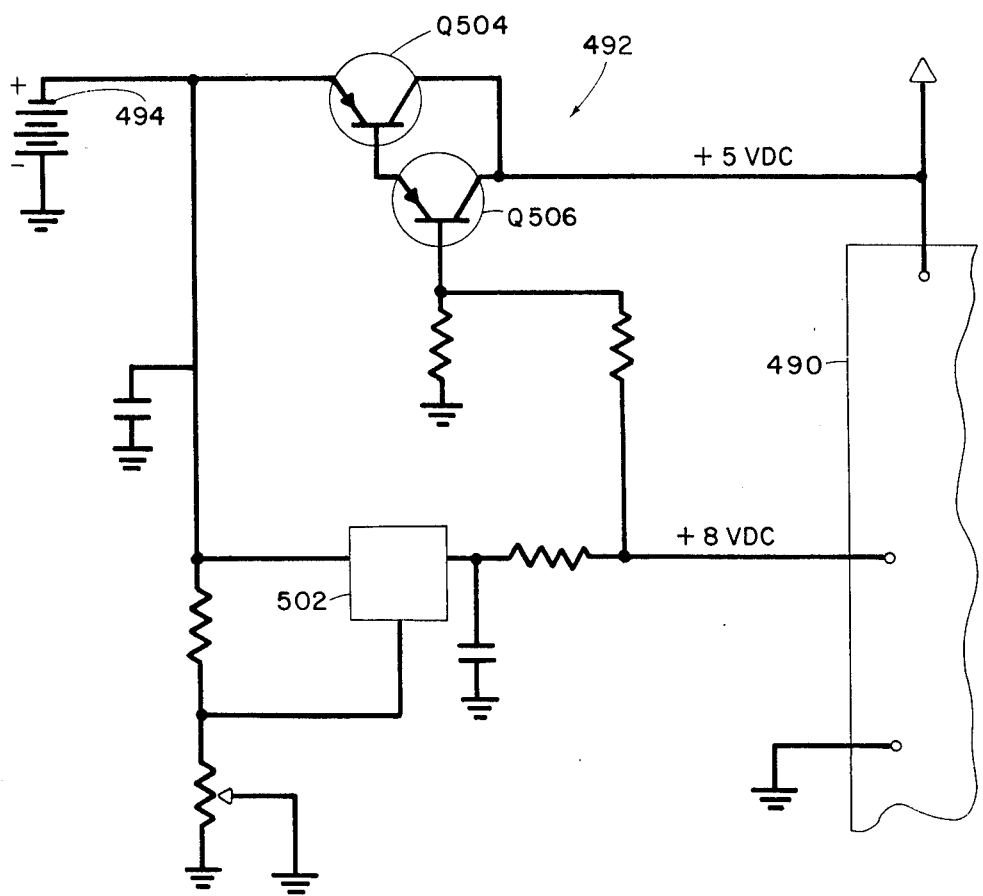
FIG. 19 is a more detailed block diagram of the battery charger and auxiliary supply switch 492 of FIG. 18.

FIG. 19 shows in detail the battery charger and auxiliary supply switch 492 of FIG. 18. As long as the 105 VAC-125 VAC source is present there is power on the +8 VDC supply line from the DC power supply 490. The +8 VDC supply line is used to charge battery 494 after being controlled and regulated by 502 (MC 7806CA, battery charger). Q504 and Q506 (PNP transistors) serve as an electronic switch which is turned off by the presence of the +8 VDC supply on the base of Q506. When the 105 VAC-125 VAC supply is lost, the +8 VDC drops which turns the switch composed of Q504 and Q506 on, allowing the battery to supply power to the +5 VDC load. Restoration of the 105 VAC-125 VAC source will turn this switch off and allow battery 494 to be charged again.

Figure 22:
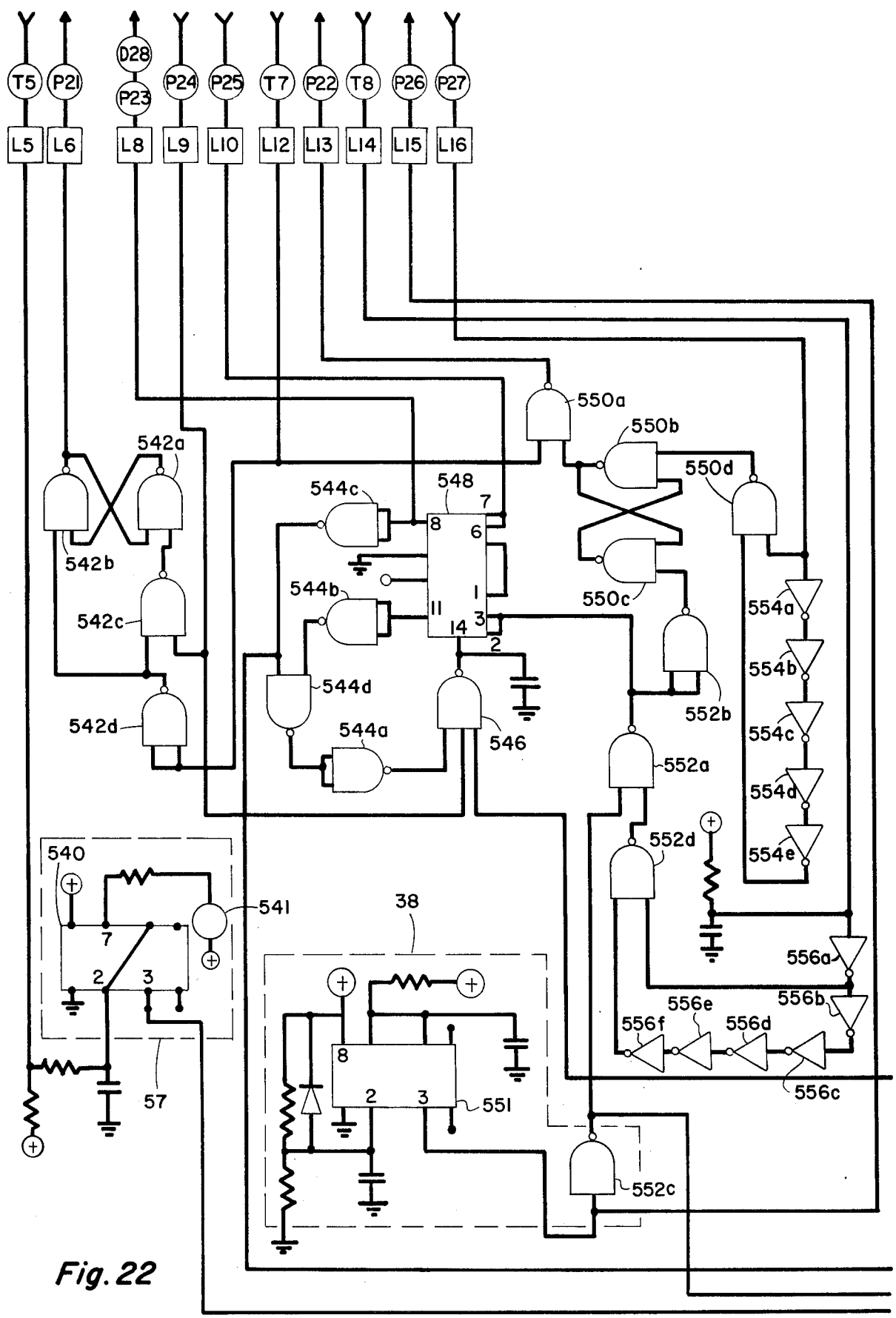
Figure 24:
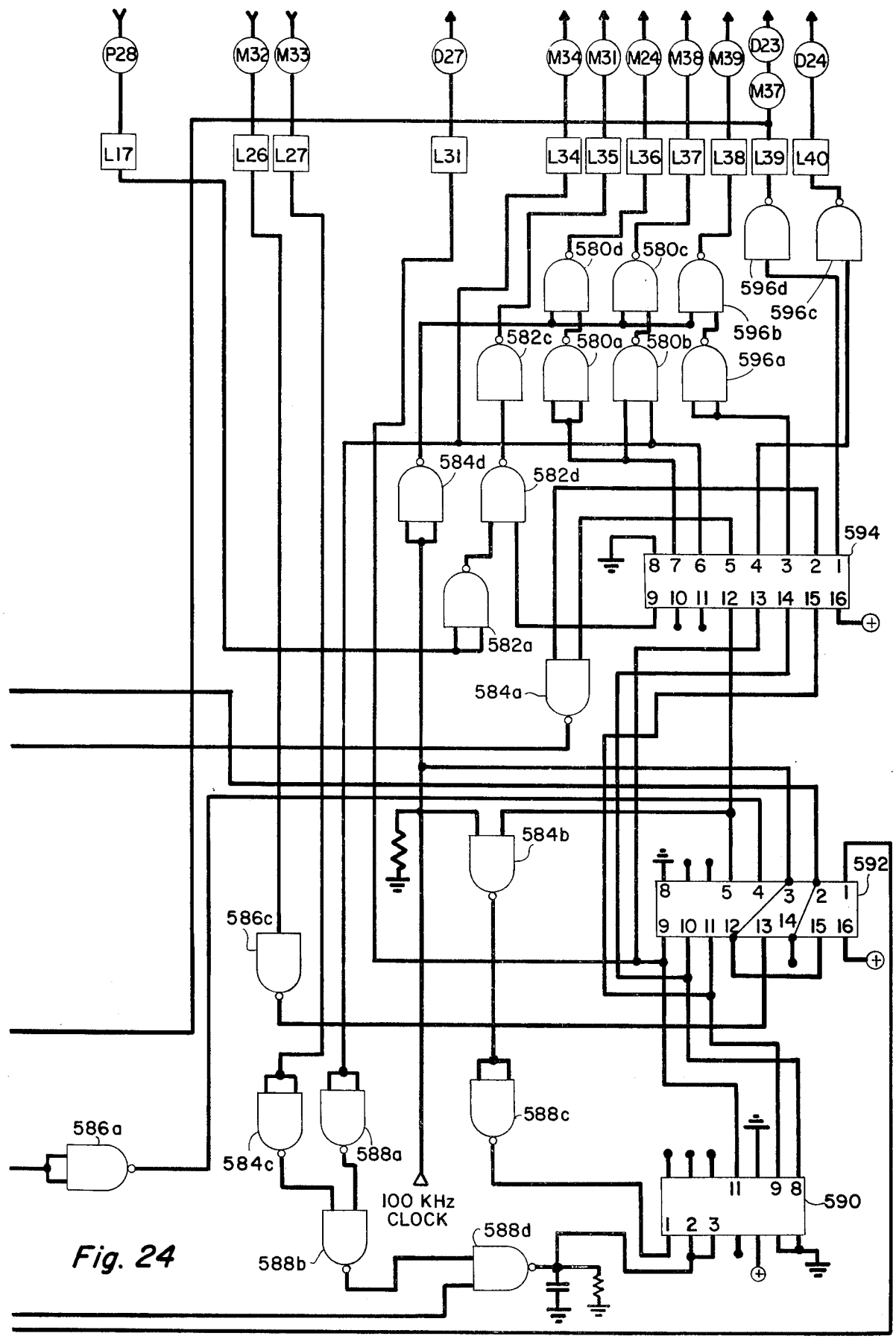

FIGS. 22, 23, and 24 are a second embodiment of the system control logic 30. The sequence of events and the connections from and to the remainder of the system are identical with the first embodiment with two exceptions (to be explained in detail hereinafter).

The power outage detector 38 is the same as that in FIG. 2 (as discussed above). When the supply voltage at pin 8, IC 551 goes low, pin 3, IC 551 will send a high pulse to IC 552c and through L15-P26 to IC 456 (FIG. 17) and ICs 384, 386 and 388 (FIG. 14) (as discussed above). IC 552c (NAND gate used as an inverter) will go low for the duration of the pulse. The low outputs of IC 552c will do two things. First, IC 552c (NAND gate) will go high. The high output of IC 552a will zero IC 548 (7490 counter). Second, the low output of IC 552c will cause 588d (NAND gate) to go high which will zero IC 590 (7493 counter). Pins 11, 9, and 8 of IC 590 will be low. These outputs go to IC 592 (74151-8 lines to one multiplexer) and IC 594 (7442-BCD (binary coded decimal) to decimal decoder).

When there is not an animal present in the feed station, the animal presence sensor 53 (FIG. 1) is high. This high output goes through connection L5-T5 to pin 2, IC 540 (NE 555). IC 540 and associated resistors and capacitors are the presence amplifier 57. Pin 3 of IC 540 will be high. The high output from IC 540 will cause IC 586*a* (NAND gate used as an inverter) to be low. Pins 11, 9, and 8, IC 590 are low. Since the inputs to pins 9, 10, and 11 of IC 592 are low, the low voltage at pin 4, IC 592 will cause pin 5, IC 592 to be low. The low input to pin 12, IC 594 with the low inputs to pins 15, 14, and 13, IC 594 will cause pin 1, IC 594 to be low. Pins 2, 3, 4, 5, 6, 7, and 9, IC 594 will be high. The output of pin 1, IC 594 goes to IC 596*d* (NAND gate used as an inverter). The high output of the inverter IC 596*d* goes through L39-M37 to zero the up-down counters 40 (FIG. 1) and L39-D23 to "unlatch" ICs 300 and 303 (FIG. 11) (as discussed above). This high output also goes to IC 546 (to be explained in detail hereinafter).

When the animal enters the feed station, pin 3, IC 540 will go low because the output of the presence sensor 53 is low. IC 586*a* will go high. This high input to pin 4, IC 592 wil cause pin 5, IC 592 to go high. The high output of pin 5, IC 592 will cause two things to happen. First, the high input to pin 12, IC 594 will cause pin 1 to go high. Pins 2, 3, 4, 5, 6, 7 and 9,IC 594 will remain high. Pins 1, 2, 3, 4, 5, 6, 7, and 9, IC 594 will remain high unless indexed by IC 590 and pin 12 is low. Only one pin at a time will go low. Second, the high input to IC 584*b* (NAND gate) will, when the 100 KHz clock pulse next goes high, go low and, when the clock pulse goes low, IC 584*b* will go high. IC 588*c* (NAND gate used as an inverter) will go high while IC 584*b* is low and will go low when IC 584*b* goes high. The high to low movement of the input to pin 1, IC 590 causes it to advance one count. The count in IC 590 is now one and pin 9, IC 590 will go high. The high input to pin 11, IC 592 (pins 9 and 10 are low) will cause IC 592 to observe the input to pin 3, IC 592 which is the 100 Kz clock pulse. Pin 5, IC 592 will go low because the clock pulse will still be low. (IC 590 did not count until the clock pulse went low.)

The low input to pin 12, IC 594 and the high input in pin 15, IC 594 from pin 9, IC 590 will cause pin 2, IC 594 to go low. This low output of pin 2, IC 594 causes IC 584*a* (NAND gate) to go high. This high signal from IC 584*a* causes Q568 to go low and turns on the scales integrator 32. The scales integrator 32 and the scales amplifier 34 operate as discussed above. IC 564, Q566, Q568 and associated resistors and capacitors are the scales integrator 32. IC 560 and associated resistors and capacitors are the scales amplifier 34 with inputs from the scales load cell 66.

When the clock pulse goes high, pin 5, IC 592 will go high. When the clock pulse goes low IC 590 will advance to a count of two (as discussed above). When pin 5, IC 592 went high, pin 2, IC 594 went high shutting off the high signal from IC 584*a* to Q568. With a count of two, pin 8, IC 590 will be high and pins 9 and 11, IC 590 will be low. Pin 5, IC 592 is low because pin 8, IC 590 is high and the output of Q566 is low during the scales integration. (Pin 3, IC 564 is high.) Because pin 8, IC 590 is high, and pins 9 and 11, IC 590 and pin 5, IC 592 are low, pin 3, IC 594 will go low. IC 596*a* (NAND gate used as an inverter) goes high. The clock pulse is inverted by IC 584*d* (NAND gate used as an inverter). When the inverted clock pulse goes high and low, IC 596*b* goes low and high, respectively. The effect is to reinvert the clock pulse. The pulsing output of IC 596*b* goes through connection L38-M39 to be counted up by the up-down counter 40 (as discussed above). When the scales integration is complete, pin 3, IC 564 goes low. The low output of pin 3, IC 564 causes the output of Q566 to go high. Pin 3, IC 594 will go high. IC 596*a* will go low and IC 596*b* will go high and remain high shutting off the pulses to the up-down counters. The high output of pin 5, IC 592 will cause, when the clock pulse goes high and then low, IC 590 to advance one. The count is now three.

Pins 8 and 9, IC 590 will be high. IC 592 is indexed to observe the input of pin 1 by having pins 11 and 10 high. Since IC 586*b* is low (to be explained in detail hereinafter), pin 5, IC 592 is low. Since the input to pin 12, IC 594 is low and the inputs to pins 14 and 15, IC 594 are high, pin 4, IC 594 will be low. IC 596*c* (NAND gate used as an inverter) will be high. The high output of IC 596*c* goes through L40-D24 to IC 314*b* (FIG. 11) to begin the animal identification process (as described above).

When the animal leaves, the animal presence sensor 53 (FIG. 1) will go high and cause pin 3, IC 540 to go high. 541 (LED) will go on. The high outputs of IC 540 and IC 544*c* (to be explained in detail hereinafter) will cause IC 586*d* (NAND gate) to go low. IC 586*b* (NAND gate used as an inverter) will go high.

The high input from IC 586*b* to pin 1, IC 592 will cause pin 5, IC 592 to go high. Pin 4, IC 594 will go high. IC 596*c* will go low and shut off the identification process if it has not been completed. The high output of pin 5, IC 592 will cause IC 590 to advance one count to four. IC 590 will have pin 11 high and pins 9 and 8 low. IC 592 will observe pin 15 which has the 100 KHz clock pulse as an input. Since the clock pulse is still low (as discussed above), pin 5, IC 592 will be low. Since pin 5, IC 592 and pins 8 and 9, IC 590 are low and pin 11, IC 590 high, pin 5, IC 594 goes low. IC 584*a* will go high and start the scales integration process (as discussed above). When the clock pulse goes high, pin 5, IC 592 will go high and pin 5, IC 594 will go high. IC 584*a* will go low which shuts off the start signal to the scales integrator 32. IC 590 advances one count. The count is five, pins 11 and 9, IC 590 are high, and pin 8, IC 590 is low.

IC 592 will observe pin 14 which is the input from the scales integrator 32. Since the output from Q566 is low, pin 5, IC 592 will be low. Pin 6, IC 594 will be low because pin 5, IC 592 and pin 8, IC 590 are low and pins 9 and 11, IC 590 are high. The low output of pin 6 does two things. First, it goes through connection L34-M34 to the up counters 41 to "load" the infomation in the addressed memory cells (as discussed above). Second, IC 580*b* (NAND gate) will go high. THe high input from IC 580*b* and the inverted 100 KHz clock output of 584*d* will cause IC 580*c* (NAND gate) to go off and on reinverting the inverted clock pulse output of IC 584*d*. The pulsing output of IC 580*c* goes through connection L37-M38 to the up-down counters 40 to be counted down (as discussed above). When scales integration is complete, Q566 will go high. Since the input to pin 14, IC 592 is high, pin 5, IC 592 will go high and pin 6, IC 594 will go high. IC 580*b* goes low and IC 580*c* will go high and remain high.

If there are fewer than four counts in the up-down counters IC 184a (FIG. 6) will be low. This low input goes through connection M23-L27 to IC 584c (NAND gate used as an inverter). IC 584c will be high. When pin 6, IC 594 is still low, IC 588a (NAND gate used as an inverter) will be high. If pin 6, IC 594 is still low when IC 184a goes low, both IC 584c and IC 588a will be high and IC 588b (NAND gate) will go low. IC 588d (NAND gate) will go high and zero IC 590. The apparatus is ready for the next animal entry.

The first embodiment had "write" operation before the system control logic 30 was ready for the next animal entry if there were less than four counts in the up-down counters 40. The second embodiment skips this step because the information that was written into the memory 42 was identical to that already contained in the memory 42. If the up-down counter counts to three or less, IC 590 is zeroed.

If there were four or more counts, IC 590 will advance one count. The count is six, pins 11 and 8, IC 590 will be high, and pin 9, IC 590 will be low. IC 592 will observe pin 13, IC 592. The input to pin 13, IC 592 is the inverted output of IC 184b (FIG. 6) indicating that the up-down counters are not at zero. The high output of IC 184b goes through connection M32-L26 to 586c (NAND gate used as an inverter). While IC 184b is high, IC 586c will be low. Pin 5, IC 592 will be low because IC 586c is low. Pin 7, IC 594 will be low (because pins 14 and 13, IC 594 are low and pin 5, IC 592 is low). IC 580a (NAND gate used as an inverter) and IC 580b (NAND gate) will go high. The high output of IC 580a will cause 580d to go high and low reinverting the inverted clock output of IC 584d. This output goes to the up counters 41 to be counted (as discussed above). IC 580c will also cycle with the clock pulse because IC 580b is high and its other input is the inverted clock pulse of IC 584d. The output of IC 580c goes to the up-down counters 40 to be counted down (as discussed above). When the up-down counter reaches zero, IC 184b (FIG. 6) goes low. IC 586c will go high. Pin 5, IC 592 goes high. Pin 7, IC 594 goes high which causes IC 580a and 580b to go low. IC 580d eand IC 580c will go high shutting off the clock pulses to the up-down counters 40 and the up counters 41.

When pin 5, IC 592 went high, IC 590 advanced one count. The count is seven. Pins 8, 9, and 11 of IC 590 are high. IC 592 will observe pin 12, IC 592 which is the clock pulse. Since the count changes when the clock goes low (as explained above), the input to pin 13, IC 592 will be low. Pin 5, IC 592 will be low. Pin 9, IC 594 will be low because pin 5, IC 592 is low and pins 8, 9 and 11, IC 590 are high. The low output of pin 9, IC 594 goes to IC 582d (NAND gate). IC 582d goes high. IC 582c (NAND gate used as an inverter) goes low. The low output of IC 582c goes through connection L35-M31 to the memory 42 to actuate the "write" operation (as discussed above). When the clock pulse goes high, pin 5, IC 592 goes high. Pin 9, IC 594 will go high. Since pin 5, IC 592 is high, IC 590 will advance one count to zero. Pins 8, 9 and 11, IC 590 will be low. IC 592 will observe pin 4. The input to pin 4, IC 592 will be low until the next animal entry (as explained above). Pin 5, IC 592 will be low and pin 1, IC 592 will be low. IC 596d (NAND gate used as an inverter) will be high and this will zero the up-down counters 40 and "unlatch" the identity number in IC 303 and 300 (FIG. 11). The apparatus is ready for the next animal to enter.

When the count in IC 590 was four, five, six and seven, pin 11, IC 590 was high. This high output goes through connection L31-D27 to inhibit the automatic memory scan 50 and insure that the address in IC 303 (FIG. 11) is used by the memory address circuit 48 (as discussed above).

The high output of IC 596d, indicating that there is not an animal present in the feed station 61, goes to IC 546 (NAND gate). When switch in the 24 hour clock 488 (FIG. 18) closes to ground to begin the print cycle, the low signal goes through connection T8-L14 to IC 556a (inverter). IC 556a will go high. Before the low signal arrived, IC 556a had been low. IC 556b (inverter) was high. IC 556c (inverter) was low. IC 556d (inverter) was high. IC 556e (inverter) was low and IC 556f (inverter) was high. ICs 556a, b, c, d, e, and f, each have a slight time delay in switching from low to high or high to low. When IC 556a goes high, IC 556f will still be high because of the time delays. IC 552d (NAND gate) will go low for a short period of time. IC 552a (NAND gate) will go high for the duration of the pulse from IC 552d. IC 552a will also go high when the power outage detector sends out its pulse. The high output of IC 552a begins the print operation.

The high pulse of IC 552a does two things. First, IC 552a will zero IC 548 (7490 counter). Second, IC 552b (NAND gate used as an inverter) goes low for the duration of the pulse. The low output of 550c will reset the 550b-550c(NAND gates) flip-flop with 550c high and 550b low. IC 550a (NAND gate) will go high and the high output goes through connection L13-P22 to turn on the printer motor (as discussed above).

The pulses from IC 428c (FIG. 16) go through P24-L9 to IC 546 (NAND gate). Since pins 8 and 11, IC 548 are low, IC 544c and IC 544b (NAND gates used as inverters) will be high. IC 544d (NAND gate) will be low. IC 544a (NAND gate used as an inverter) will be high. If an animal has entered the feed station and the output of the animal presence sensor 53 if low, the output of IC 596d will be low (as discussed above). This will prevent the pulses from IC 428c (FIG. 16) from being counted by IC 548. When there is not an animal present and the count in IC 590 is zero, IC 596d will be high.

When IC 428c (FIG. 16) goes high, IC 546 will go low. These low pulses are counted by IC 548. When IC 548 has counted four pulses pin 8, IC 548 will go high. This high signal from pin 8, IC 548 does four things. First, the high output goes through L8-P23 to begin the print cycle (as discussed above). Second, the hih output goes through L8-D28 to the memory address circuit 48. The memory address circuit will address the identity from the printer circuit 54. Third, IC 544c will go low. This low signal will prevent the high at pin 3, IC 540, (indicating the animal has left) from being passed to pin 1, IC 592 by ICs 586d and 586b. IC 586d will remain because IC 544c is low and IC 590 will remain at count three with the input to pin 1,IC 592 low. Fourth, because IC 544c is low, IC 544d will go high. IC 544a will go low, and IC 546 will go high and remain high. IC 546 will not pass any further counts to IC 548.

When a line is printed out and IC 436a (FIG. 16) goes high, the high output goes through P28-L17 to IC 582a (FIG. 24) (NAND gate used as an inverter). IC 582a will go low. IC 582d will go high. IC 582c will go low. The low output of IC 582c is the "write" signal to the memory 42 (as discussed above). The printer circuit 54 has already zeroed the up counters 41.

When the print cycle is complete and IC 460b (FIG. 17) goes high, the high output of IC 460b goes through connection P25-L10 to pins 6 and 7, IC 548. This will set IC 548 with pin 11 high and pin 8 low. With pin 8 low, IC 544c will be high and allow the high signal from pin 3, IC 540 to pass to pin 1, IC 592. The system control logic 30 will resume its normal operation. The high at pin 11 will cause IC 544b (NAND gate used as an inverer) to go low. IC 544d will be high and IC 544a will be low preventing pulses from the printer circuit 54 from being passed to IC 548.

When IC 426d (FIG. 17) goes high indicating that six lines have been skipped since the end of the print cycle, the high output of IC 426d goes through connection P27-L16 to ICs 550d (NAND gate) and 554a inverter. IC 554a, b, c, d, and e are all inverters. When the output from IC 426d was low, IC 554a was high. IC 554b was low, IC 554c was high, 554d was low and IC 554e was high. Each inverter has a small time delay before its output changes. After the input to IC 554a is high, IC 554e will remain high for a very short period of time. IC 550d will go low and set the IC 550b-550c flip-flop with IC 550b high and IC 550c low. IC 550a will go low and shut off the printer motor.

This embodiment does not require the door switch. When the skip switch (not shown) is switched to ground, the low signal goes through connection T7-L12 to ICs 550a and 542d. IC 550a will go high and turn on the motor (as discussed above). IC 542d (NAND gate used as an inverter) will go high. Since IC 542d had been low, the IC 542b-542a flip-flop would have been reset by IC 542d with IC 542b high and IC 542a low. When IC 428c (FIG. 16) goes high, IC 542c (NAND gate) will go low because IC 542d is high. When IC 542c goes low, it will set the IC 542b-542a flip-flop with IC 542b low and IC 542a high. When IC 542b was low, this low signal went through connection L6-P21 (designated T6-P21 FIG. 17) to IC 450a to skip lines. The printer mechanics 55 will skip lines until the drum position pulses causes IC 428c (FIG. 16) to go high or the skip switch is switched off ground and IC 550a goes low turning off the motor and ends the skip function. This will set 542b high (as explained above) and IC 450a (FIG. 17) will go low.

SUMMARY OF OPERATION

An animal having its own identification tag thereon enters the feed station, interrupts a beam of light from a lamp, and actuates a photo-sensing device. The photo-sensing device sends a signal which causes the weight of food in the feed hopper to be determined by converting the analog voltage output of the scales load cell to a series of discrete pulses. The cumulation of the number of pulses generated is stored. The system control logic then allows an interrogation coil to be turned off and on by a receiver. The interrogation coil sends an electromagnetic impulse towards the identification tag. One or more reed switches within the tag which are wired in parallel closes, and the tag sends out a signal. The frequency of the signal is determined by a crystal within the tag and is different for each tag. The receiver will scan all of the tag frequencies and identify the tag which is transmitting. The interrogation coil is turned off and on by the receiver as it scans the frequencies to verify that the signal received is from a tag and not some outside source. The identity number obtained is stored and the receiver will continue to scan the frequencies. The identity number obtained on the next scan is also stored. The two numbers are compared, and, if they are identical, the interrogation ceases.

When the animal leaves the feed station, the light beam is remade and the weight of food in the hopper is again converted to a series of pulses which are used to reduce the stored cumulation of pulses generated when the animal entered. A line of communication is opened up to memory cells in a memory, the memory cells corresponding to the identification number. The remainder, if it is significant, is added to the cumulation of weight already contained in the memory cells corresponding to the identification number of the animal and placed therein.

Once every 24 hours a clock will actuate the system control logic which will turn on a printer. The identity number and weight of food consumed stored in the memory will be printed out for each animal individually. The memory is zeroed as the weight of food consumed is printed out. The closing of a manually operated switch allows the memory to be scanned, without actuating the printer, by observing the incandescent display.

Whereas the present invention has been described in particular relation to the drawings attached hereto, it should be understood that other and further modifications, apart from those shown or suggested herein, may be made within the spirit and scope of this invention.

What is claimed is:

1. Apparatus for determining and registering the amount of food consumed by each of a plurality of animals comprising a feed station, a scale located at the feed station, a feed hopper containing food mounted on the scale, presence sensing means for sensing the arrival and departure of an animal to and from the feed station, scale weight measuring means connected to the scale and responsive to the actuation of said presence sensing means for determining the amount of food in the hopper, identification means responsive to activation of the presence sensing means by the arrival of the animal to determine the identity of the given animal, consumption measuring means responsive to the scale weight measuring means for determining the increment of food consumed by the animal between its arrival and departure, memory means for storing the cumulative totals of food consumed by each animal individually, additive means responsive to said consumption measuring means for determining and storing in the memory means the cumulation of the previous consumption total stored in the memory means plus said increment of food determined by the consumption measuring means, memory address means responsive to the actuation of said presence sensing means upon the departure of said animal from said feed station and responsive to the identity determined by said identification means for connecting the additive means into that portion of said memory means corresponding to the given animal, means responsive to actuation of the additive means and the completion of its function for returning the consumption measuring means and the identification means to their initial states in preparation for the next animal entry, register means connected to said memory means and intermittently operable to recall and register the identity and corresponding amounts of food consumed by each animal individually as stored in the memory means, said identification means including an electromagnetic coil located at the feed station and responsive to the actuation of the presence sensing means by the animal's arrival for providing electromagnetic pulses, identity means on each animal, each identity means including an internal source of power for the identity means, a transmitter tuned to a specific frequency assigned to the given animal, magnetically responsive reed switch means normally open but closable in response to electromagnetic pulses from said electromagnetic coil to power said transmitter in said identity means, a receiver at the feed station for receiving the transmission of said identity means, a frequency sensitive means in said receiver to determine which of the plurality of identity means is transmitting, and identification storage means connected to said receiver for storing in said storage means the identity determined by said frequency sensing means.

2. Apparatus as set forth in claim 1 wherein said receiver includes verification means for verifying the identification determined by said frequency sensitive means and preventing said memory address means from responding to an incorrect identification.

3. Apparatus as set forth in claim 2 wherein said verification means is responsive to stray outside R.F. transmissions in timed relation to the actuation of said electromagnetic coil in performing the verification.

4. Apparatus as set forth in claim 1 wherein said identification means is included in said memory address means whereby the identity of the given animal is retained in said memory address means until said additive means completes its function.

5. Apparatus as set forth in claim 1 wherein said memory means is comprised of a plurality or memory cells corresponding to said plurality of animals, respectively, and wherein said memory address means connects said additive means to cells of said memory means corresponding to said given animal.

6. Apparatus as set forth in claim 1 wherein said scale weight measuring means includes a load cell providing an output voltage which varies with the weight of food in the hopper, and means for converting the output voltage from said load cell into a series of pulses corresponding in number to the magnitude of said voltage.

7. Apparatus as set forth in claim 1 wherein said additive means is responsive to said consumption measuring means only when said increment of food exceeds a predetermined value.

8. Apparatus as set forth in claim 1 wherein said register means comprises a cycling means connected to said memory address means for providing said memory address means with addresses in succession for each animal individually, a printer connected to said memory address means and to said memory means for printing the identity and corresponding amounts of food consumed by each animal individually, a clock for actuating said register means periodically, and means connected to said memory means responsive to the operation of said printer for zeroing said memory means after the amounts of food consumed are printed.

9. Apparatus as set forth in claim 1 including a scanning means comprising sequencing means connected to said memory address means for providing said memory address means with the addresses in succession for each animal individually, switch means connected to said sequencing means and manually operable for actuating said sequencing means, and incandescent display connected to said memory address means and said memory means for visually displaying the identity and the corresponding amounts of food consumed by each animal individually in response to the actuation of said sequencing means.

* * * * *